(12) United States Patent
Liu et al.

(10) Patent No.: US 11,322,794 B2
(45) Date of Patent: May 3, 2022

(54) BATTERY PACK WITH GAS DISCHARGING PASSAGE

(71) Applicants: CPS Technology Holdings LLC, New York, NY (US); Clarios Advanced Solutions GmbH, Hannover (DE)

(72) Inventors: Chang Liu, Shanghai (CN); Yingyao Fu, Shanghai (CN); Binbin Fan, Shanghai (CN); Joerg Birkholz, Sarstedt (DE)

(73) Assignees: CPS Technology Holdings LLC, New York, NY (US); Clarios Advanced Solutions GmbH, Hannover (DE)

( * ) Notice: Subject to any disclaimer, the term of this patent is extended or adjusted under 35 U.S.C. 154(b) by 357 days.

(21) Appl. No.: 16/348,461

(22) PCT Filed: Nov. 9, 2017

(86) PCT No.: PCT/IB2017/056995
§ 371 (c)(1),
(2) Date: May 8, 2019

(87) PCT Pub. No.: WO2018/087681
PCT Pub. Date: May 17, 2018

(65) Prior Publication Data
US 2019/0363324 A1    Nov. 28, 2019

(30) Foreign Application Priority Data

Nov. 9, 2016    (CN) .......................... 201610987163.2

(51) Int. Cl.
*H01M 50/35*    (2021.01)
*H01M 10/613*    (2014.01)
(Continued)

(52) U.S. Cl.
CPC ......... *H01M 50/35* (2021.01); *H01M 10/425* (2013.01); *H01M 10/613* (2015.04);
(Continued)

(58) Field of Classification Search
CPC .. H01M 50/35; H01M 10/613; H01M 10/625; H01M 10/6221; H01M 50/502;
(Continued)

(56) References Cited

U.S. PATENT DOCUMENTS

| 2007/0037053 A1 | 2/2007 | Anantharaman |
| 2010/0009244 A1 | 1/2010 | Murata |

(Continued)

FOREIGN PATENT DOCUMENTS

| CN | 1192591 A | 9/1998 |
| CN | 201689923 U | 12/2010 |

(Continued)

OTHER PUBLICATIONS

International Search Report and Written Opinion of the International Authority dated Apr. 4, 2018, for PCT/IB2017/056993 filed Nov. 9, 2017.

(Continued)

*Primary Examiner* — Helen Oi K Conley
(74) *Attorney, Agent, or Firm* — Boardman & Clark LLP

(57) ABSTRACT

The present disclosure provides a battery pack including: multiple flat battery cells, a housing, a bearing plate and an upper cover, wherein a middle recessed portion is formed between the protruding battery cell anode and battery cell cathode disposed on the top portion of each of the multiple battery cells; a surface of the middle recessed portion is provided with at least one seal-breakable opening arranged to discharge the gas generated in the battery cell when broken; the multiple middle recessed portions at the top portions of the multiple battery cells form a battery top (Continued)

portion through-slot; a bottom portion of the bearing plate is provided with a bearing plate bottom portion through-slot; the bearing plate bottom portion through-slot is press-fitted with the battery top portion through-slot to form a lateral gas discharging passage wherein one end of the lateral gas discharging passage is provided with an outlet, and another end of the lateral gas discharging passage is blocked. The gas discharging passage of the present disclosure utilizes the existing structures of the battery pack without additionally designing a separate specific gas discharging passage.

8 Claims, 16 Drawing Sheets

(51) Int. Cl.
*H01M 10/625* (2014.01)
*H01M 10/6551* (2014.01)
*H01M 10/42* (2006.01)
*H01M 50/20* (2021.01)
*H01M 50/502* (2021.01)
*H01M 50/342* (2021.01)

(52) U.S. Cl.
CPC ..... *H01M 10/625* (2015.04); *H01M 10/6551* (2015.04); *H01M 50/20* (2021.01); *H01M 50/3425* (2021.01); *H01M 50/502* (2021.01); *H01M 2010/4271* (2013.01); *H01M 2220/20* (2013.01)

(58) Field of Classification Search
CPC . H01M 50/3425; H01M 50/20; H01M 10/425
See application file for complete search history.

(56) References Cited

U.S. PATENT DOCUMENTS

| | | |
|---|---|---|
| 2010/0081041 A1 | 4/2010 | Okada et al. |
| 2011/0151311 A1 | 6/2011 | Lee et al. |
| 2012/0177969 A1 | 7/2012 | Jin |
| 2012/0264002 A1 | 10/2012 | Osaki |
| 2012/0270083 A1 | 10/2012 | Kim |
| 2013/0101883 A1 | 4/2013 | Zhao |
| 2013/0115496 A1 | 5/2013 | Mack |
| 2013/0171478 A1 | 7/2013 | Ushijima |
| 2014/0087231 A1 | 3/2014 | Schaefer et al. |
| 2015/0004459 A1 | 1/2015 | Yamamoto |
| 2015/0037629 A1 | 2/2015 | Janarthanam |
| 2015/0069829 A1 | 3/2015 | Dulle et al. |
| 2015/0369829 A1 | 3/2015 | Dulle |
| 2015/0125720 A1 | 5/2015 | Fujii et al. |
| 2015/0132634 A1 | 5/2015 | Sera |
| 2015/0295215 A1 | 10/2015 | Nagamine et al. |
| 2015/0333304 A1 | 11/2015 | Sekine |
| 2016/0036088 A1 | 2/2016 | Tononishi |
| 2016/0056514 A1 | 2/2016 | Ahn |
| 2016/0064702 A1 | 3/2016 | Tyler et al. |
| 2016/0093849 A1 | 3/2016 | DeKeuster |
| 2016/0248061 A1 | 8/2016 | Brambrink |
| 2016/0336549 A1 | 11/2016 | Brisbane |
| 2017/0062783 A1 | 3/2017 | Kim |

FOREIGN PATENT DOCUMENTS

| | | |
|---|---|---|
| CN | 102867932 A | 1/2013 |
| CN | 202797121 U | 3/2013 |
| CN | 202977642 U | 6/2013 |
| CN | 203377271 U | 1/2014 |
| CN | 104011901 A | 8/2014 |
| CN | 104081559 A | 10/2014 |
| CN | 104103781 A | 10/2014 |
| CN | 104103801 A | 10/2014 |
| CN | 104124402 A | 10/2014 |
| CN | 104124406 A | 10/2014 |
| CN | 102479986 A | 5/2015 |
| CN | 204424346 U | 6/2015 |
| CN | 105322122 A | 2/2016 |
| CN | 105489812 A | 4/2016 |
| CN | 105518903 A | 4/2016 |
| CN | 105531845 A | 4/2016 |
| DE | 102008010838 | 8/2009 |
| DE | 102010038862 A1 | 2/2012 |
| EP | 1217681 A3 | 6/2002 |
| EP | 2518792 A1 | 10/2012 |
| JP | 5128825 B2 | 8/2008 |
| JP | 2008192342 A | 8/2008 |
| JP | 2010211950 A | 3/2009 |
| JP | 2010277735 A | 12/2010 |
| JP | 2015179618 A | 10/2015 |
| WO | 2012042913 A1 | 4/2012 |
| WO | 2016140430 A1 | 9/2016 |

OTHER PUBLICATIONS

International Search Report and Written Opinion of the International Search Authority dated Apr. 13, 2018, for PCT/IB2017/056994 filed Nov. 9, 2017.
International Search Report and Written Opinion of the International Search Authority dated Jan. 18, 2018, for PCT/IB2017/056995 filed Nov. 9, 2017.
International Search Report and Written Opinion of the International Search Authority dated Mar. 29, 2018, for PCT/IB2017/056996 filed Nov. 9, 2017.

FAN CONTROL CIRCUIT

BATTERY PACK WITH GAS DISCHARGING PASSAGE

CROSS REFERENCE TO RELATED APPLICATIONS

This application is a national stage application of PCTIB2017056995, entitled "BATTERY PACK WITH GAS DISCHARGING PASSAGE", filed Nov. 9, 2017, Publication No. WI 2018/087681.

TECHNICAL FILED

The present disclosure generally relates to a battery pack comprised of a plurality of battery cells, and more particularly to a battery pack having a gas discharging passage and comprising a plurality of serially-connected battery cells for a hybrid vehicle.

BACKGROUND

To improve fuel efficiency, in addition to enhance efficiency of a traditional gasoline engine, a hybrid vehicle also can use a battery pack comprised of a plurality of serially-connected battery cells as a DC power source providing a certain voltage for an electric motor to help driving the hybrid vehicle. For example, by serially connecting 13 battery cells each having a 3.65V DC voltage, a battery pack having a 48V DC voltage may be formed as a DC power source providing the 48V DC voltage.

Constant development of hybrid vehicles sets a higher requirement on the DC power source. For example, newly designed hybrid vehicles are equipped with some parts that require a larger driving current, including an electric air-conditioner, an electric turbocharger, and an electric power steering, etc. Moreover, the newly designed hybrid vehicles have higher requirements on boost, start-stop, and brake energy recovery (Recuperation). In addition, the newly designed hybrid vehicles require that the DC power source can save fuel consumption to a greater extent (about 15%) and further reduce gas emissions (especially $CO_2$ emissions).

The newly design hybrid vehicles' high requirements above on the DC power source make battery pack design more difficult. Further, despite of their higher performance requirements on the DC power source, the new-design hybrid vehicles require no increase in its volume and size; despite of an increased current output, a superb anti-overheat performance is required. These requirements make it even more difficult to design the battery pack.

The existing DC power sources often cannot meet the higher requirements of the newly designed hybrid vehicles on the DC power source. Therefore, there is a need to provide a battery pack as a DC power source in a hybrid vehicle, the structure of which is adapted to the higher requirements on the DC power source of the new-design hybrid vehicle.

SUMMARY OF THE INVENTION

A series of simplified concepts are introduced in the Summary section, which will be described further in detail in the Detailed Description of The Invention section. The Summary of the present disclosure is not intended to limit key features and essential technical features of the technical solutions as claimed, let alone defining the protection scope thereof.

To overcome the deficiencies in the prior art, the present disclosure provides a battery pack for a hybrid vehicle. The battery pack is provided with a housing and an upper cover, wherein the housing has a bottom portion; the housing further has a first length side wall, a second length side wall, a first width side wall and a second width side wall that extend upward surrounding a periphery of the bottom portion; the first length side wall, the second length side wall, the first width side wall and the second width side wall form an upper portion opening; the upper cover is mounted on the upper portion opening of the housing; and the battery pack is characterized by comprising:

multiple flat battery cells sequentially arranged and mounted in the housing;

a bearing plate, wherein the bearing plate is disposed above the top portions of the multiple battery cells; and a middle recessed portion formed between protruding battery cell anode and battery cell cathode disposed on the top portion of each of the multiple battery cells, wherein a surface of the middle recessed portion is provided with at least one seal-breakable opening, and the at least one seal-breakable opening is arranged to discharge a gas generated in the battery cell when broken;

when the multiple battery cells are sequentially arranged and mounted in the housing, the multiple middle recessed portions at the top portions of the multiple battery cells form a battery top portion through-slot; and a bottom portion of the bearing plate is provided with a bearing plate bottom portion through-slot, and when the bearing plate is mounted above the top portions of the multiple battery cells, the bearing plate bottom portion through-slot is press-fitted with the battery top portion through-slot to form a lateral gas discharging passage, wherein one end of the lateral gas discharging passage is provided with an outlet, and another end of the lateral gas discharging passage is blocked.

The battery pack as described above is characterized in that:

the housing has a vertical gas discharging passage, and the vertical gas discharging passage is disposed on an inner side of the first width side wall;

the first width side wall is provided with a gas discharging port; and the vertical gas discharging passage is in fluid communication with the lateral gas discharging passage.

The battery pack as described above is characterized by further comprising:

a first end plate and a second end plate, wherein when the multiple battery cells are sequentially arranged and mounted into the housing, the first end plate and the second end plate are located at two end sides of the sequentially arranged multiple battery cells to laterally fix the sequentially arranged multiple battery cells.

The battery pack as described above is characterized in that:

an upper end of the first end plate is provided with a ventilation guide slot, and the ventilation guide slot is located between the lateral gas discharging passage and the vertical gas discharging passage to enable the lateral gas discharging passage to be in fluid communication with the vertical gas discharging passage.

The battery pack as described above is characterized by further comprising:

an electronic component for controlling the battery pack is mounted on a reverse face of the first end plate.

The battery pack as described above is characterized in that:

the bottom portion is provided with a heat dissipation apparatus, wherein the heat dissipation apparatus is provided with an air passage, and the air passage has an inlet and an outlet.

The battery pack as described above is characterized in that:

the heat dissipation apparatus is provided with a heat dissipation pad, and two sides of the heat dissipation pad are in contact with the bottom portions of the multiple battery cells and an upper portion of the air passage respectively.

The battery pack as described above is characterized in that:

the bearing plate fixes the sequentially arranged and mounted multiple battery cells in a perpendicular direction of the housing.

The battery pack as described above is characterized by further comprising:

a circuit board, wherein a control circuit is mounted on the circuit board; and a harness, wherein part of the harness is loaded on the bearing plate, and the harness comprises multiple connection wires to connect each of the multiple battery cells to the control circuit.

The battery pack as described above is characterized by further comprising:

multiple battery cell bus bars, wherein the multiple battery cell bus bars are accommodated in the bearing plate; the multiple battery cell bus bars are configured to connect each of the multiple battery cells together in series.

The battery pack as described above is characterized in that:

a distal end of the bearing plate bottom portion through-slot is provided with a blocking plate, and when the bearing plate is mounted at the top portions of the multiple battery cells so that the bearing plate bottom portion through-slot is press-fitted with the battery top portion through-slot to form a lateral gas discharging passage, the another end of the lateral gas discharging passage is blocked by the blocking plate.

When an extreme circumstance occurs to the battery pack provided by the present disclosure, the battery cells will be broken to release gas, avoiding risks from the battery pack; in prior designs, a gas discharging passage needs to be designed for the battery pack to discharge the gas released from breaking of the battery cells out of the battery pack; while in the present disclosure, an improvement is made by using the structure of the battery pack per se to form a gas discharging passage, which makes it unnecessary to additionally design a specific gas discharging passage; in this way, the present disclosure saves materials and space and makes the structure of the battery pack compact.

BRIEF DESCRIPTION OF THE DRAWINGS

These and other features and advantages of the present disclosure may be better understood by reading through Detailed Description below with reference to the drawings. Throughout the drawings, identical reference numerals represent identical components, wherein.

DETAILED DESCRIPTION OF THE INVENTION

Figure 1A:
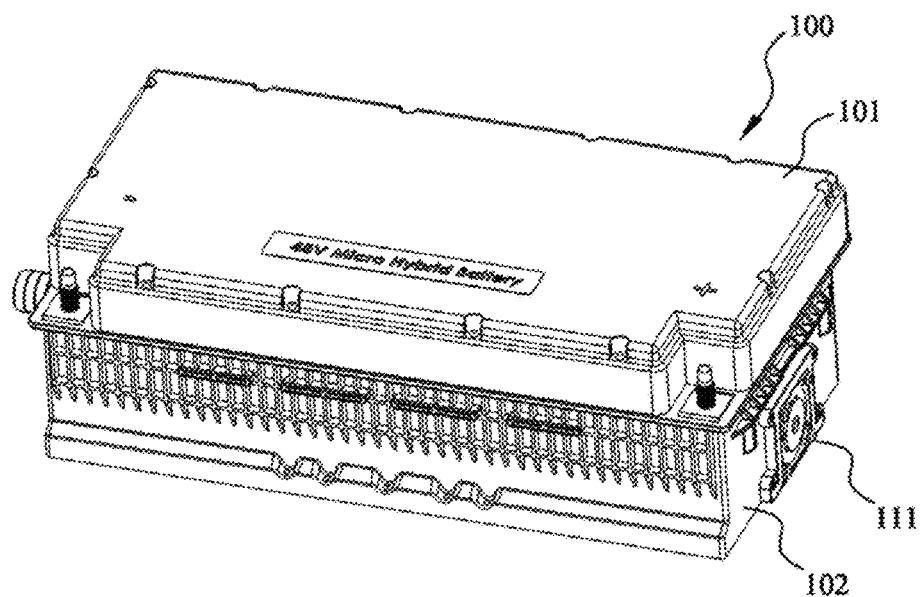
FIG. 1A is a schematic diagram of a battery pack according to the present disclosure, in which a fan is mounted.

Hereinafter, various specific embodiments of the present disclosure will be described with reference to the accompanying drawings which constitute part of the specification. It should be noted that although terms indicating directions, such as "front," "back," "up," "down," "left," "right," and other directional or orientational words, are used herein to describe various exemplary structural parts and elements of the present disclosure, these terms are used herein only for the convenience of description, which are determined based on the exemplary orientations shown in the drawings. Because the examples disclosed in the present disclosure may be arranged in different directions, these directional terms are only used for illustration purpose and should not be regarded as limiting. In the accompanying drawings below, identical or similar reference numerals are used to indicate identical or similar components.

Figure 1B:
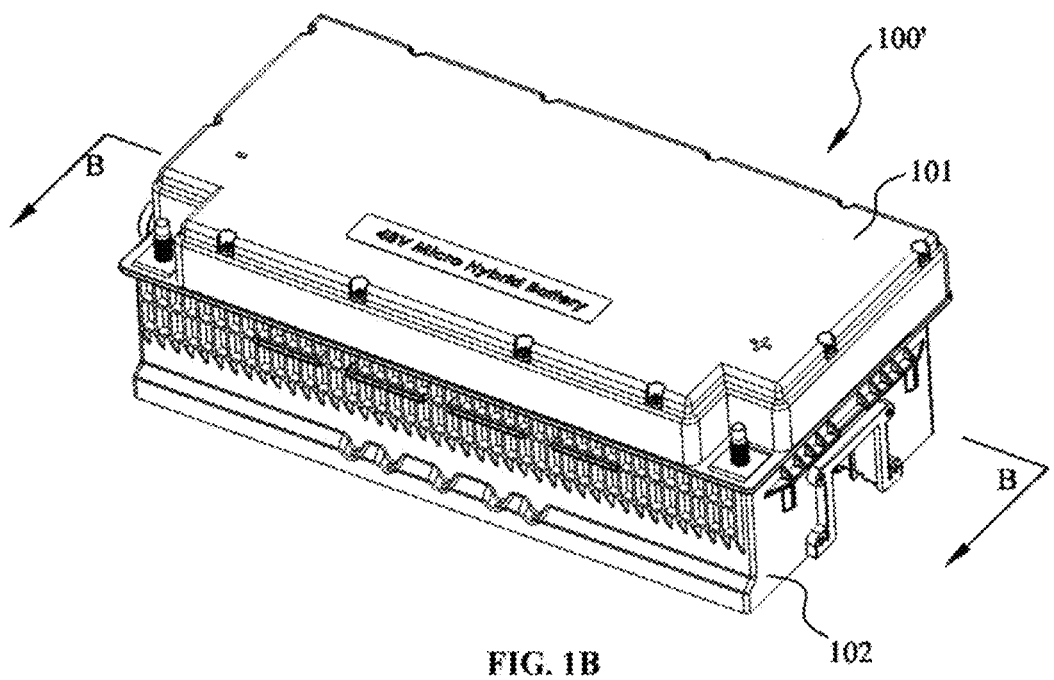
FIG. 1B is a schematic diagram of a battery pack without mounting a fan according to the present disclosure.

Both FIG. 1A and FIG. 1B show a battery pack according to the present disclosure. The battery pack is mainly used for a hybrid vehicle. As shown in FIGS. 1A and 1B, the battery pack 100 comprises an upper cover 101 and a housing 102, the upper cover 101 covering the housing 102 to form the battery pack 100 that is closed to the outside. The battery pack 100 may optionally have a fan assembly 111 mounted on the housing 102, wherein FIG. 1A shows a battery pack 100 mounted with a fan, and FIG. 1B shows a battery pack 100' without mounting a fan, to adapt to different users' demands.

Figure 1C:
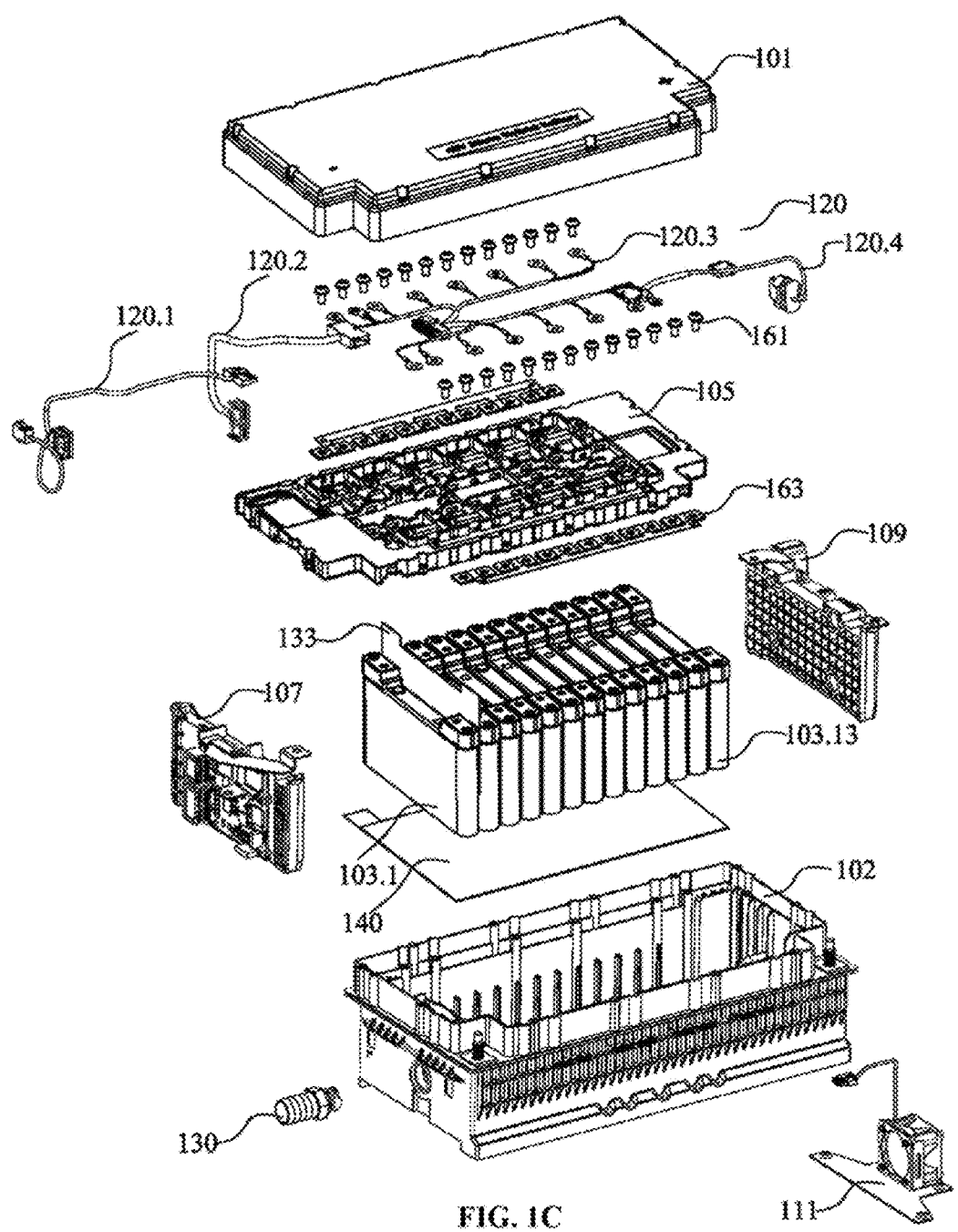
FIG. 1C is an exploded schematic view of the battery pack in FIG. 1A.

FIG. 1C shows an exploded schematic view of the battery pack 100 in FIG. 1A. As shown in FIG. 1C, in addition to the upper cover 101 and the housing 102, the battery pack 100 further comprises several battery cells 103, a bearing plate 105, a first end plate 107, a second end plate 109, and a harness 120. The several battery cells 103 are sequentially arrayed and mounted in the housing 102. The first end plate 107 and the second end plate 109 are disposed at two end sides of the several mounted battery cells 103, respectively, to laterally secure the several mounted battery cells 103. The bearing plate 105 is disposed above the several mounted battery cells 103, and the harness 120 is borne by the bearing plate 105. As shown in FIGS. 1A and 1B, the battery pack 100 may optionally further comprise a fan assembly 111. In addition, a gas discharging nozzle 130 is also mounted on a side wall of the housing 102. A partition plate 133 is provided between every two adjacent battery cells 103, to partition off two adjacent battery cells 103. A heat dissipation pad is provided beneath the several battery cells 103, to conduct out heat generated by the several battery cells 103. The battery pack 100 further comprises several battery cell bus bars 163 that are secured on the cathodes and anodes of the battery cells 103 through battery cell fasteners 161, thereby serially connecting two adjacent battery cells 103. The harness 120 has a harness first segment 120.1, a harness second segment 120.2, a harness third segment 120.3, and a harness fourth segment 120.4, the functions of which will be detailed infra.

Figure 2A:
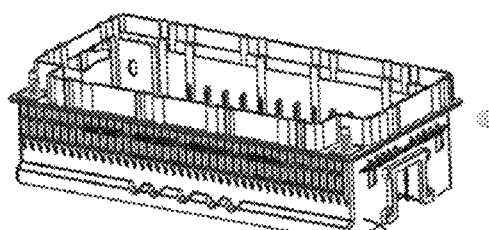
FIGS. 2A-F are schematic diagrams of the mounting process of the battery pack shown in FIG. 1A.
Figure 2B:
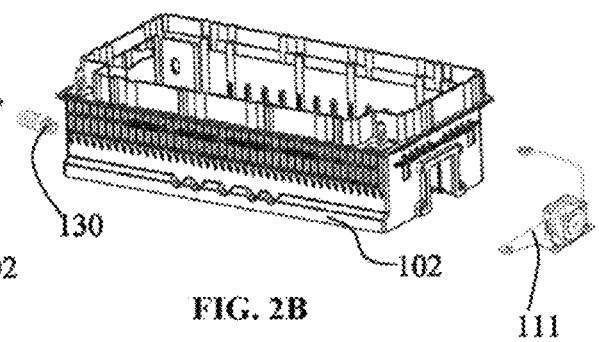
Figure 2C:
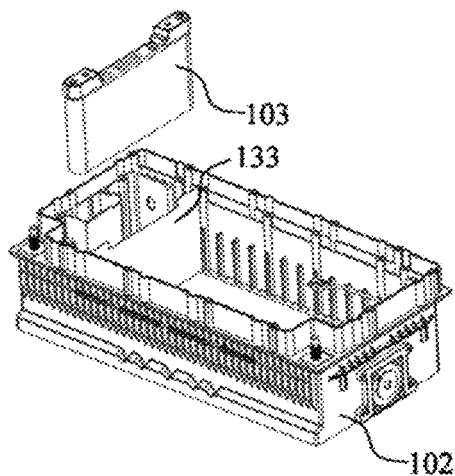
Figure 2D:
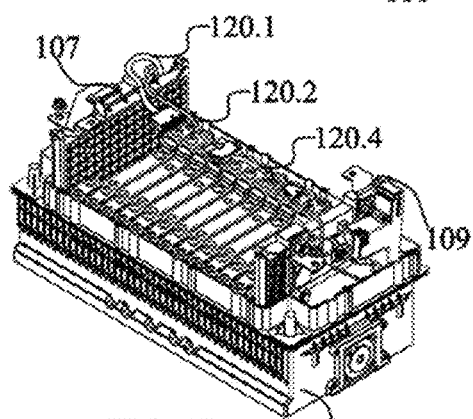
Figure 2E:
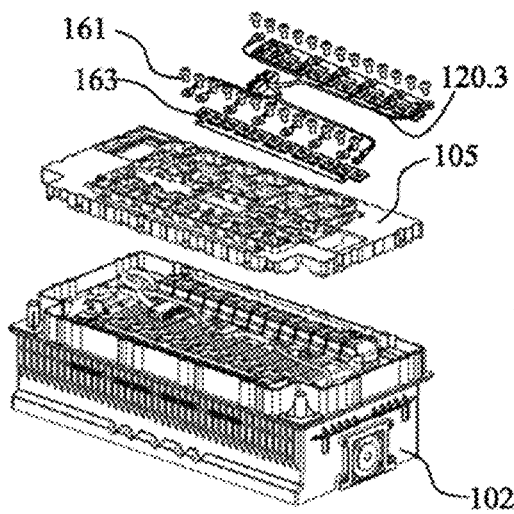
Figure 2F:
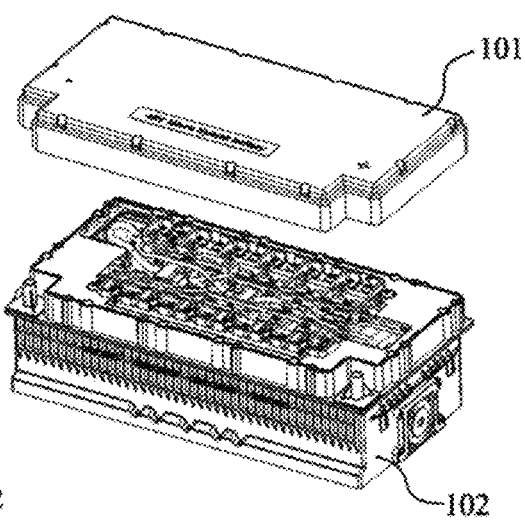

Hereinafter, a mounting process of the battery pack in FIG. 1 will be introduced in detail with reference to FIGS. 2A-F. First, as shown in FIGS. 2A and 2B, the gas discharging nozzle 130 and the fan assembly 111 are mounted to corresponding positions of the housing 102, respectively. Then, as shown in FIG. 2C, the several battery cells 103 are inserted into the housing 102 one by one, such that a polarity of each battery cell 103 is disposed to be opposite to the polarity of an adjacent battery cell, and the partition plate 133 is inserted between adjacent battery cells 103. Afterwards, as shown in FIG. 2D, the first end plate 107 and the second end plate 109 are inserted into the battery housing 102, respectively, such that they are disposed at two sides of the several sequentially arrayed battery cells 103, respectively. However, before inserting the first end plate 107 and the second end plate 109 into the battery housing 102, one end of the harness first segment 120.1 and one end of the harness second segment 120.2 are connected to the first end plate 107, respectively; one branch wire of one end of the harness fourth segment 120.4 (this end of the fourth segment 120.4 has two branch wires); the other branch thereof is connected to the fan assembly 111; then, the other end of the harness first segment 120.1 is connected to the other end of the harness fourth segment 120.4. Next, as shown in FIG. 2E, the several battery cell bus bars 163 are first disposed at corresponding positions on the bearing plate 105; then the bearing plate 105 is disposed on the housing 102; thereafter, the harness third segment 120.3 and the battery cell bus bars 163 are secured onto the electrodes of the battery cells 103 via the battery cell fasteners 163, one end of the harness third segment 120.3 is connected to the harness second segment 120.2, and the bearing plate 105 is secured onto the housing 102 through fasteners. In this way, the bearing plate 105 is disposed above the several battery cells 103 and the two end plates (107, 109) in the housing. Finally, as shown in FIG. 2F, the upper cover 101 is secured onto the housing 102 of the battery pack to finish mounting the battery pack 100.

Hereinafter, specific structures of various components of the battery pack 100 will be introduced in detail.

Figure 3:
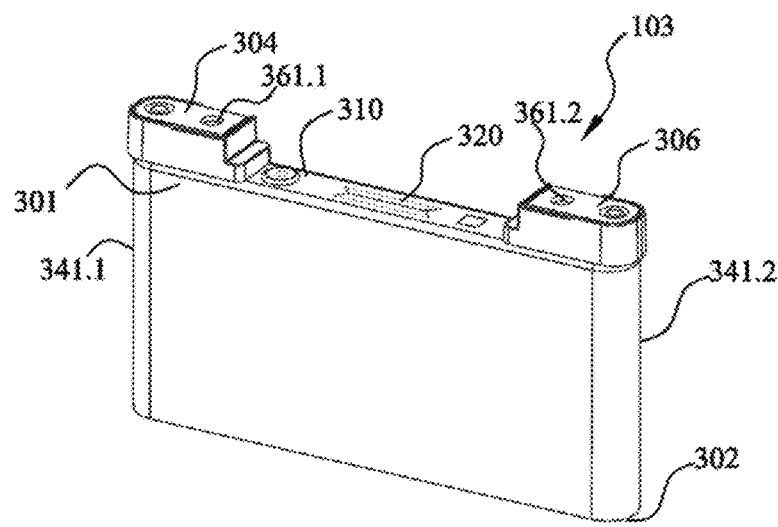
FIG. 3 is a stereoscopic view of a battery cell in a battery pack according to the present disclosure.

First, a battery cell 103 in the battery pack of the present disclosure will be introduced with reference to FIG. 3. As shown in FIG. 3, the battery cell 103 is of a substantially flat cuboid shape. The battery cell 103 has a top portion 301 and a bottom portion 302 in an up-down direction; the battery cell 103 is inserted into the housing 102 from the bottom portion 302. The battery cell 103 further has a battery cell first end portion 341.1 and a battery cell second end portion 341.2 in a left-right direction. The top portion 301 of the battery cell 103 is provided with a battery cell cathode 304 and a battery cell anode 306, the battery cell cathode 304 and the battery cell anode 306 being proximal to the battery cell first end portion 341.1 and the battery cell second end portion 341.2, respectively, and the battery cell cathode 304 and the battery cell anode 306 being protrudingly provided thereby to form a battery cell recessed portion 310 in a middle of the top portion 301 of the battery cell 103. A seal-breakable opening 320 is provided on the battery cell recessed portion 310; when the battery cell 103 is in a normal working state, the seal-breakable opening 320 is in a sealed state; when an extreme circumstance occurs to the battery cell 103, the seal-breakable opening 320 is broken to release the high-temperature gas inside the battery cell, thereby releasing the pressure inside the battery cell to avoid risks. A hole 361.1, 361.2 is provided on the battery cell cathode 304 and the battery cell anode 306, respectively, to mount the battery cell fasteners 161.

Figure 4A:
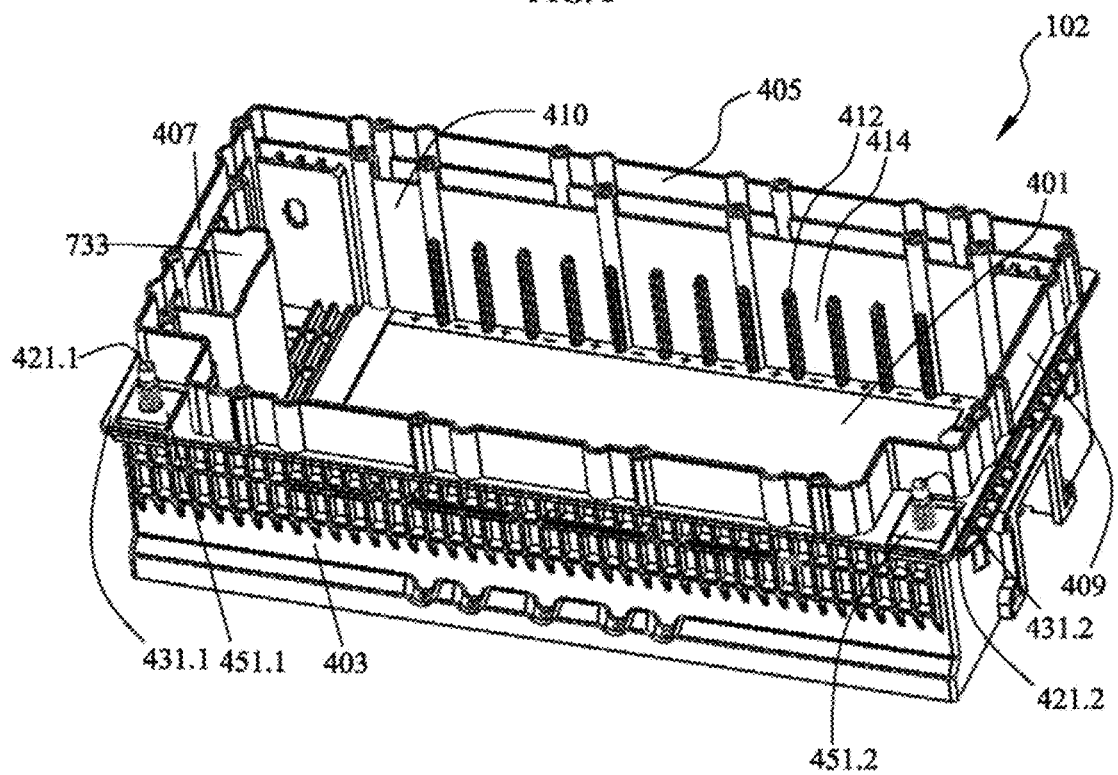
FIG. 4A is a stereoscopic schematic view of a housing of a battery pack according to the present disclosure.
Figure 4B:
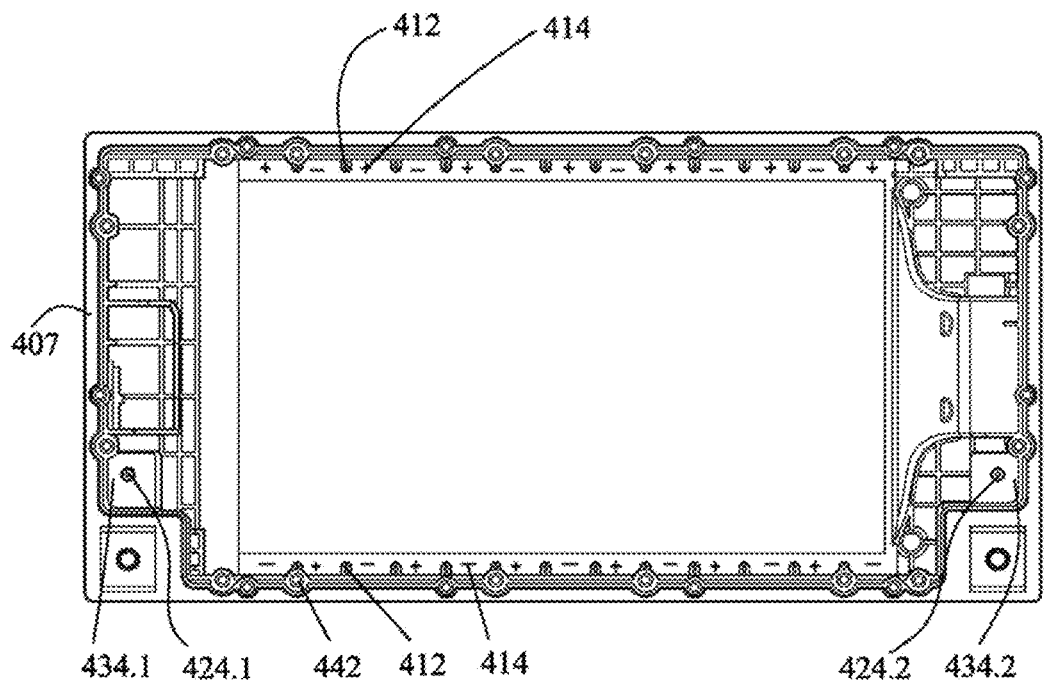
FIG. 4B is a top schematic view of the housing of the battery pack according to the present disclosure.

FIGS. 4A and 4B show a housing of a battery pack of the present disclosure, wherein FIG. 4A is a stereoscopic schematic view of the housing, and FIG. 4B is a top view of the housing. As shown in FIG. 4A, the housing 102 has a bottom portion 401, a first length side wall 403 and a second length side wall 405 being disposed oppositely and extending upwards along the length direction of the bottom portion 401, and a first width side wall 407 and a second width side wall 409 being disposed oppositely and extending upwards along the width direction of the bottom portion 401. The bottom portion 401, the first length side wall 403, the second length side wall 405, the first width side wall 407, and the second width side wall 409 together form the housing 103 closed at the bottom portion and the four sides with an upper portion opening 410 from which the battery cell 103, the first end plate 107 and the second end plate 109 may be inserted into the housing 102. Several guide ribs are provided on the inner sides of the first length side wall 403 and the second length side wall 405 of the housing 102, wherein the guide ribs 412 on the first length side wall 403 and the guide ribs 412 on the second length side wall 405 are oppositely provided; a cellular slot 414 is formed between adjacent two guide ribs 412 on each length side wall, the cellular slot 414 facilitating mounting the battery cell 103.

With reference to FIG. 4B, FIG. 4B shows more clearly the guide ribs 412 and the cellular slots 414 on the first length side wall 403 and the second length side wall 405. Each battery cell 103 is inserted into a pair of oppositely disposed cellular slots 414 provided on the first length side wall 403 and the second length side wall 405, respectively, to enable the first end portion 341.1 and the second end portion 341.2 of the battery cell to be stuck into the oppositely disposed cellular slots 414, respectively, such that after the battery cell 103 is inserted into the housing 102, the guide rib 412 may limit a horizontal movement of the battery cell 103 along the length direction of the housing 102, thereby enabling each battery cell 103 to be securely disposed in the housing 102. The housing 102 is provided with several mounting holes 442 for fitting with corresponding mounting holes on the bearing plate 105, such that the bearing plate 105 may be secured on the housing 102 through fasteners.

Still shown in FIG. 4A, at two junctions between the two end portions of the first length side wall 403 and the first width side wall 407 and the second width side wall 409, the first length side wall 403 is bent at two end portions thereof towards a direction of the second length side wall 405, and two end portions of the first width side wall 407 and the second width side wall 409 adjacent to the first length side wall 403 are bent towards each other respectively, so as to form the first step 431.1 and the second step 431.2 at two junctions between the first length side wall 403 and the end portions of the first width side wall 407 and the second width side wall 409. The first step 431.1 and the second step 431.2 are provided at a position of the first length side wall 403 adjacent to the upper opening 410. A first metal wiring terminal 421.1 is provided on the first step 431.1, and a second metal wiring terminal 421.2 is provided on the second step 431.2, the first metal wiring terminal 421.1 and the second metal wiring terminal 421.2 being used for connecting external loads of the battery pack 100.

Figure 5A:
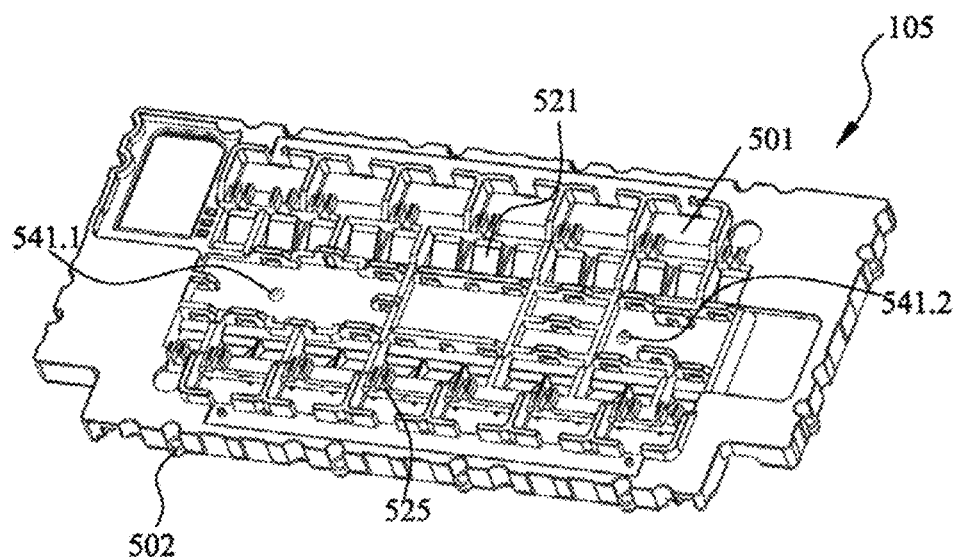
FIG. 5A is a stereoscopic schematic view of a bearing plate of a battery pack according to the present disclosure.
Figure 5B:
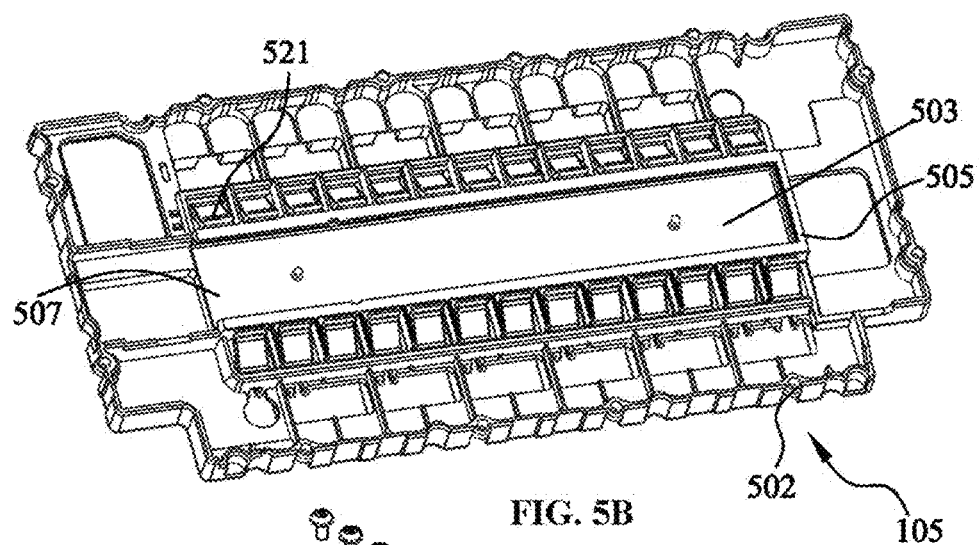
FIG. 5B is a stereoscopic schematic view from another perspective of the bearing plate in FIG. 5A.

FIG. 5A and FIG. 5B show stereoscopic views from two different perspectives of the bearing plate of the battery pack of the present disclosure, wherein FIG. 5A shows a top portion of the bearing plate, while FIG. 5B shows a bottom portion of the bearing plate. As shown in FIGS. 5A and 5B, several windows 501 through the bearing plate are provided on the bearing plate 105, the several windows 501 being arranged for accommodating several battery cell bus bars 163, respectively. A bottom portion of the bearing plate 105 has a bearing plate bottom portion through-slot 503, and a distal end of the bearing plate bottom portion through-slot 503 is provided with a blocking plate 505. A metal sheet 507 is mounted at a slot bottom of the bearing plate bottom portion through-slot 503; the metal sheet 507 is secured through bolts (541.1, 541.2). Several springs 521 pivotally connected with the bearing plate are provided at both sides of the bearing plate bottom portion through-slot 503, respectively; the several springs 521 are disposed such that when the bearing plate 105 is mounted on the housing 102, the several springs 521 are located above the cathodes and anodes of the several battery cells 103, respectively. One side of the spring 521 proximal to the bearing plate bottom portion through-slot 503 is connected to the bearing plate 105, such that one side of the spring 521 distal to the bearing plate bottom portion through-slot 503 may pivotally move.

When the bearing plate 105 is mounted onto the housing 102 from above the battery cell 103, the spring 521 presses tightly against the cathode and anode of each battery cell 103 through a pivotal movement. A top portion of the bearing plate 105 is further provided with several clamps 525 for securing the harness 120. Several mounting holes 502 are provided at a periphery of the bearing plate 105, for fitting with several mounting holes 442 on the housing 102, so that the bearing plate 105 may be fixed onto the housing 102 through fasteners.

Figure 6:
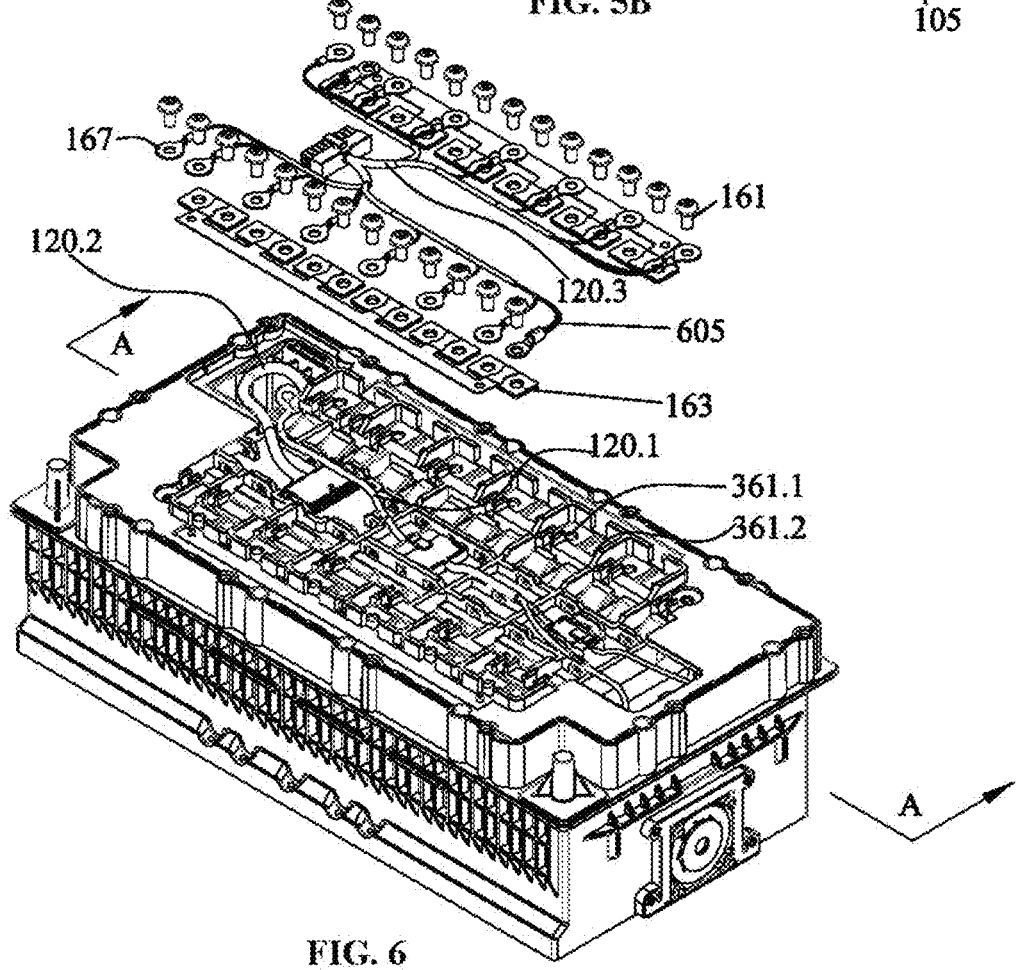
FIG. 6 is an exploded schematic view of part of components of a battery pack according to the present disclosure, showing that the battery cells and the bearing plate are mounted in the housing, while a harness, battery cell bus bars, and battery cell fastener are disassembled.

FIG. 6 is an exploded schematic view of part of components of the battery pack according to the present disclosure, showing that the battery cells and the bearing plate are mounted in the housing, while a harness, battery cell bus bars, and a battery cell fastener are disassembled. As shown in FIG. 6, among several windows 501 on a bearing plate 105, each window 501 exactly faces a cathode and an anode of two adjacent battery cells. In other words, a cathode of a battery cell and an anode of a battery cell adjacent thereto may be seen through each window 501. As mentioned above, the battery cell cathode 304 and the battery cell anode 306 of each battery cell have a hole 361.1 and 361.2, respectively; therefore, the hole 361.1 on one battery cell cathode 304 and the hole 361.2 on one battery cell anode 306 may be seen through each window 501. A battery cell bus bar 163 is mounted in each window 501. Each battery cell bus bar 163 has two bus bar holes, aligned with the hole 361.1 on the battery cell cathode 304 and the hole 361.2 on the battery cell anode 306 in the window 501 where they are mounted, respectively, such that the battery cell fastener 161 may enter the hole 361.1 on the battery cell cathode 304 and the hole 361.2 on the battery cell anode 306 through the bus bar hole, thereby securing the battery cell bus bar 163 onto the battery cell 103 to enable a serial connection of adjacent battery cells 103. The several battery cells connected in series form a cathode output end and an anode output end, which will be detailed infra.

As still shown in FIG. 6, the harness 120 comprises a harness third segment 120.3 having several wires 605, and one end of each of the several wires 605 has a terminal 607 with a terminal hole. Before securing the battery cell bus bar 163 onto the battery cell 103 via the battery cell fastener 161, the terminals 607 of the several wires 605 should be placed on the battery cell bus bar 163, to align the terminal hole with the bus bar hole so that the battery cell fastener 161 may also pass through the terminal hole to connect the terminal 607 to the cathode and anode of the battery cell 103. The other ends of the several wires 605 are connected to the control circuit 1501 via the harness second segment 120.2 (see FIG. 15), such that the control circuit 1501 may acquire the current and voltage between respective battery cells 103, thereby monitoring the working state of respective battery cells 103.

Figure 7:
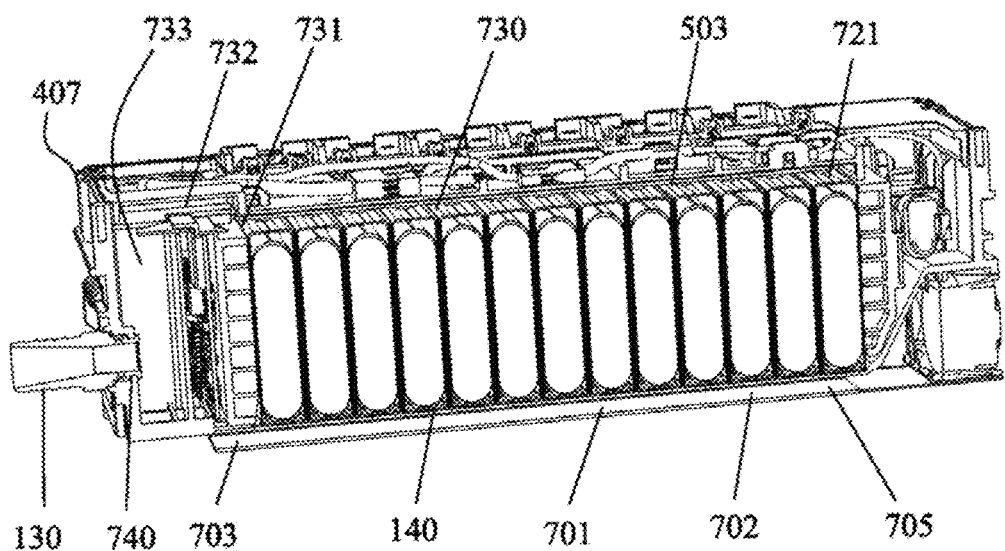
FIG. 7 is a sectional schematic view along A-A sectional line in FIG. 6.

FIG. 7 is a sectional schematic view along the A-A line of FIG. 6. FIG. 7 shows a gas discharging passage of a battery pack according to the present disclosure. As shown in FIG. 7, when several battery cells 103 are successively arrayed and mounted into the housing 102, several middle recessed portions 310 of the several battery cells 103 form a battery top portion through-slot 721. Because the bottom portion of the bearing plate 105 has a bearing plate bottom portion through-slot 503, when the bearing plate 105 is mounted above the top portions 310 of the several battery cells 103, the bottom portion through-slot 503 of the bearing plate 105 is press-fitted with the battery cell top portion through-slot 721, forming a lateral gas discharging passage 730. A distal end (i.e., the right end in FIG. 7) of the lateral gas discharging passage 730 is closed, while the other end of the lateral gas discharging passage 730 has an outlet 731. In one embodiment of the present disclosure, the closed end of the lateral gas discharging passage 730 is sealed by a distal end blocking plate 505 of the bottom portion through-slot 503 of the bearing plate 105. However, it should be noted that in another embodiment, one end of the lateral gas discharging passage 730 may also be sealed by a blocking plate disposed on an adjacent end plate.

Still referring to FIG. 7, the housing 102 has a vertical gas discharging passage 733, the vertical gas discharging passage 733 being provided at an inner side of the first length side wall 407 of the housing 102 and being in fluid communication with the lateral gas discharging passage 731. A gas discharging port 740 is provided on the first length side wall 407, and a gas discharging nozzle 130 may be mounted on the gas discharging port 740 to discharge the gas in the battery pack 100. The connection between the vertical gas discharging passage 733 and the lateral gas discharging passage 731 is implemented via a middle gas discharging passage 732. The middle gas discharging passage 732 is formed jointly by the first end plate 107 and the bearing plate 105 adjacent to the vertical gas discharging passage 733. The specific structure of the middle gas discharging passage 732 will be detailed infra when introducing the first end plate 107 shown in FIGS. 9A-9C.

When an extreme circumstance occurs to the battery pack such that an inner pressure of the battery cell 103 exceeds a tolerance value of the battery cell 103, the seal-breakable opening 320 of the battery cell 103 will be broken so that a gas or a gas-liquid mixture doped with some liquid may be released out of the battery cell 103, and the gas or gas-liquid mixture may flow from the lateral gas discharging passage 730 towards the vertical gas discharging passage 733 via the middle gas discharging passage 732 and then be discharged outside of the battery pack 100 via the gas discharging nozzle 130 mounted on the gas discharging port 740, thereby avoiding risks. Because the top portion (i.e., the slot bottom of the bearing plate bottom portion through-slot 503) of the lateral gas discharging passage 730 is provided with a metal base plate 507, a material of the metal base plate 507, which has a better thermostability than that of the material of the bearing plate 105, may endure the high-temperature gas or gas-liquid mixture released from the battery cell seal-breakable opening 320.

In the present disclosure, the lateral gas discharging passage 730, the vertical gas discharging passage 733, and the middle gas discharging passage 732 of the battery pack 100 are all formed by using the built-in structures of the structural parts of the battery pack, e.g., the battery cells 103, the first end plate 107, the bearing plate 105, and the housing 102, without a need of additionally separately manufacturing a gas discharging passage. In this way, the battery pack may be more easily assembled and has a more compact structure with a reduced manufacturing cost.

Figure 8A:
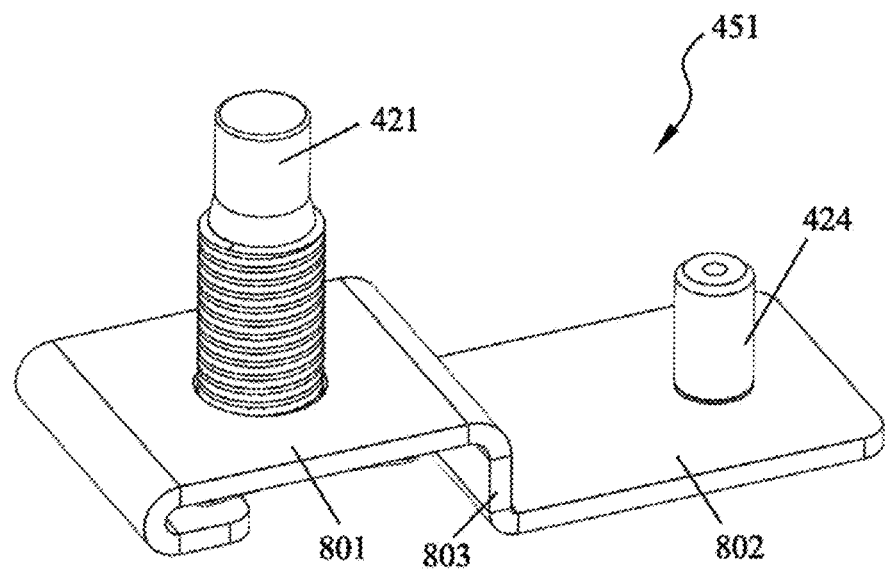
FIG. 8A is a stereoscopic schematic view of a metal sheet in a battery pack of the present disclosure.
Figure 8B:
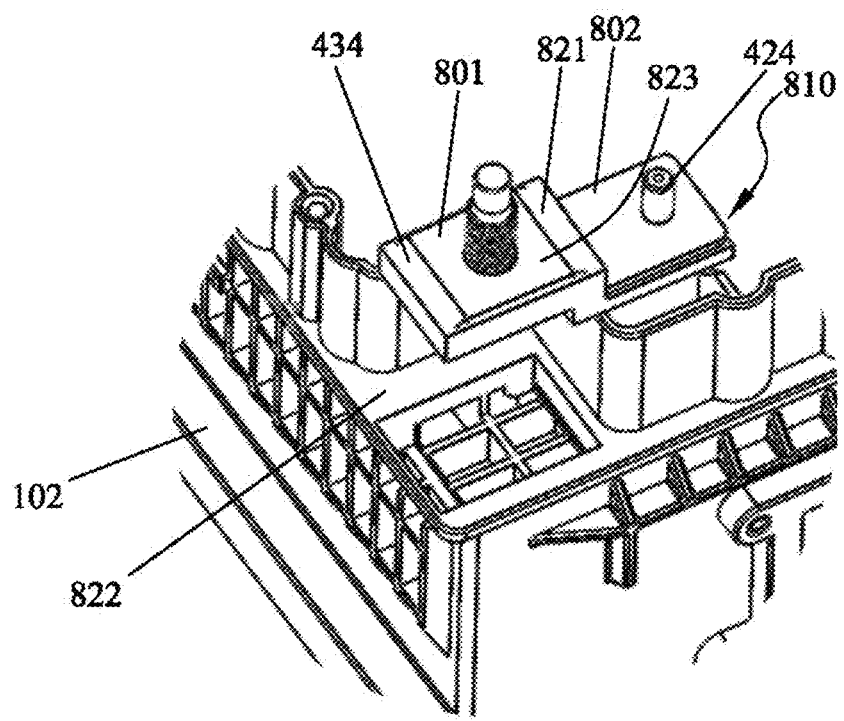
FIG. 8B is an exploded schematic view of a prefabricated assembly and a housing in a battery pack of the present disclosure.
Figure 8C:
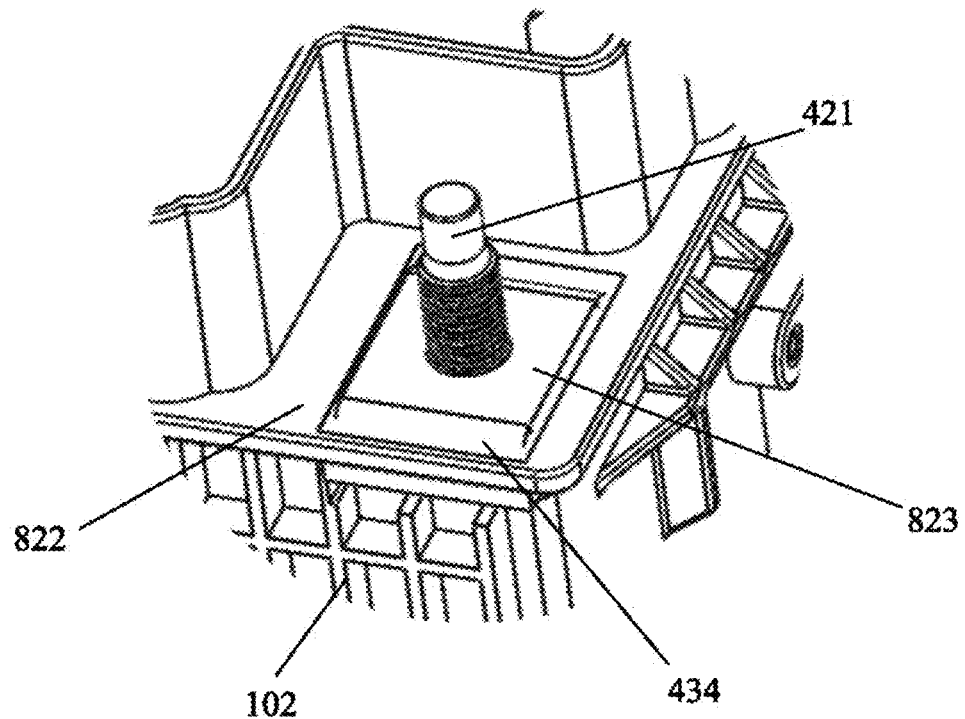
FIG. 8C is a partial enlarged view of a battery pack of the present disclosure, which shows that the prefabricated assembly is embedded in the housing.

FIGS. 8A, 8B, and 8C show a metal sheet in the battery pack of the present disclosure, wherein FIG. 8A is a stereoscopic schematic view of the metal sheet, FIG. 8B is an exploded schematic view of a prefabricated assembly molded by a metal sheet and a first plastic, and a housing, and FIG. 8C is a partial enlarged schematic view of the housing mounted with the prefabricated assembly. Generally, the metal sheet functions to lead the cathode and anode output ends of the several serially connected battery cells from the inside of the battery pack housing to the outside, thereby facilitating a connection between the battery pack and an external load. As shown in FIG. 8A, the metal sheet 451 has a first end 801 and a second end 802 that are connected via a middle portion 803. A plane of the first end 801, a plane of the second end 802, and the middle portion 803 are integrally formed pieces, wherein the plane of the first end 801 is higher than the plane of the second end 802. An outer side of the first end 801 is bent inwardly to limit a rotation of the components mounted at a bottom face of the first end 801 relative to the plane of the first end 801. The first end 801 is mounted with a metal wiring terminal 421, and the second end 802 is mounted with a leading-out terminal 424. The metal wiring terminal 421 is electrically conducted with the leading-out terminal 424, wherein the metal wiring terminal 421 is arranged for connection with the external load, and the leading-out terminal 424 is in electrically conductive connection with the several serially connected battery cells 103 inside the battery pack 100.

Hereinafter, referring to FIG. 8B, the metal sheet 451 is mounted onto the step 431 of the housing 102 of the battery pack 102 in an insert-molded manner. Specifically, the metal sheet 451 is a prefabricated component, by embedding the prefabricated metal sheet 452 into the first plastic material 821 to prepare the prefabricated assembly 810 by molding, and then embedding the prefabricated assembly 810 into the housing 102. For the prefabricated assembly 810 shown in FIG. 8B, the first plastics 821 forms a plastic substrate 434 surrounding the metal sheet 451. The first plastic material 821 has good insulation and anti-corrosion performance. The housing 102 is made of a second plastic material 822, or most of the housing 102 is made of the second plastic material; the second plastic material 822 has good mechanical performance. According to an embodiment of the present disclosure, the first plastics may be Polyphthalamide, and the second plastics may be Nylon 66. However, those skilled in the art should understand that the first plastics and the second plastics adopting other materials having the performance above are also within the protection scope of the present disclosure. During a process of using the battery pack 100, the metal wiring terminal 421 will generate heat due to existence of the external load, and meanwhile it is susceptible to a redox reaction; therefore, it is relatively high demanding on the insulation, thermostability and anti-corrosion performance of the plastic material surrounding the metal wiring terminal 421; accordingly, the demand on the material surrounding the metal wiring terminal 421 may be satisfied by selecting the first plastic material to form the plastic substrate 434 surrounding the metal wiring terminal 421. The reason for the battery pack housing 102 adopting the second plastic material is that the battery pack housing 102 needs to protect internal parts of the battery pack; therefore, the housing 102 needs a higher strength and hardness. Accordingly, the material of the housing 102 needs to select a material having good mechanical performance. By adopting two different kinds of plastics for the prefabricated assembly 810 and the housing 102, the requirements on the material of the metal wiring terminal 451 and the housing 102 may be simultaneously satisfied.

As illustrated in FIGS. 8A, 8B and 8C, on the first end 801 of the metal sheet 452, the metal wiring terminal 421 is surrounded by a metal surface 823 not cladded by the first plastic material 821, thereby enlarging the electrically conductive contact area when the metal wiring terminal 421 is connected to the external load. The metal surface 823 slightly protrudes above the plane of the plastic substrate 434 formed by the first plastic material 821 (e.g., this may be implemented in the following way: tilting slightly downward the portions adjacent to the two ends of the first end 801 of the metal sheet 452, to enable the plastic substrate 434 to cover the downwardly tilted portions), thereby facilitating the operation of connecting the metal wiring terminal 421 with the external load. On the second end 802 of the metal sheet 452, the leading-out terminal 424 is disposed on the plastic substrate 434 formed by the first material 821. In other words, the first plastic material 821 covers the portion of the second end 802 other than the leading-out terminal 424.

FIG. 8C shows that the prefabricated assembly 810 has been insert-molded in the housing 102. When the housing 102 is molded using the second plastic material, the prefabricated assembly 810 is covered partially by the second plastic and disposed on the step 431 of the housing 102; the plane of the first plastic material surface 821 is substantially flush with the plane of the step 431 of the housing 102.

Figure 9A:
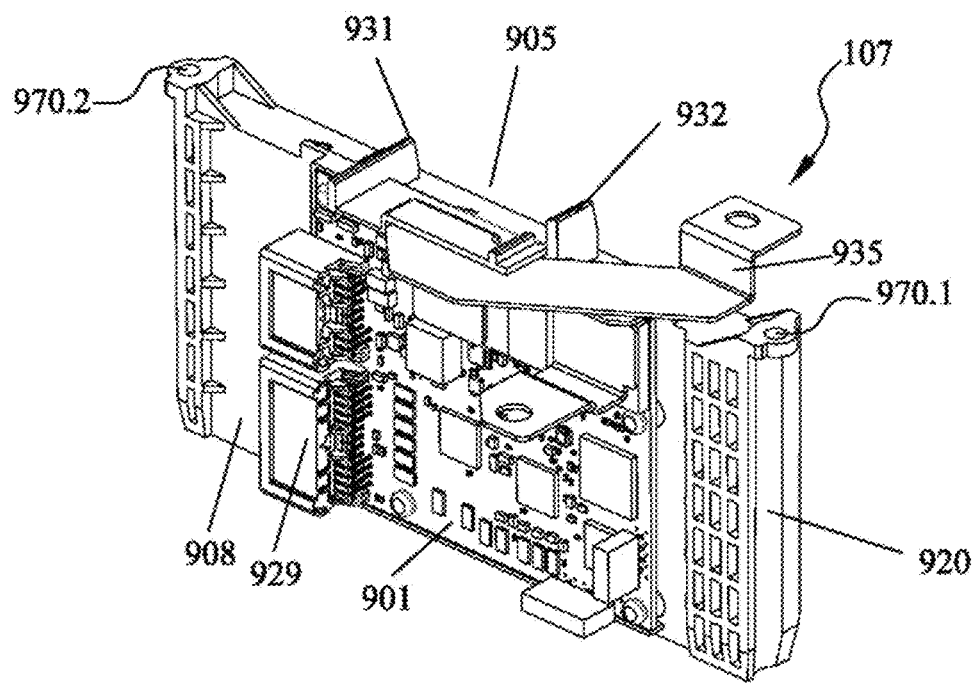
FIG. 9A is a schematic diagram of a reverse face of a first end plate of a battery pack of the present disclosure.
Figure 9B:
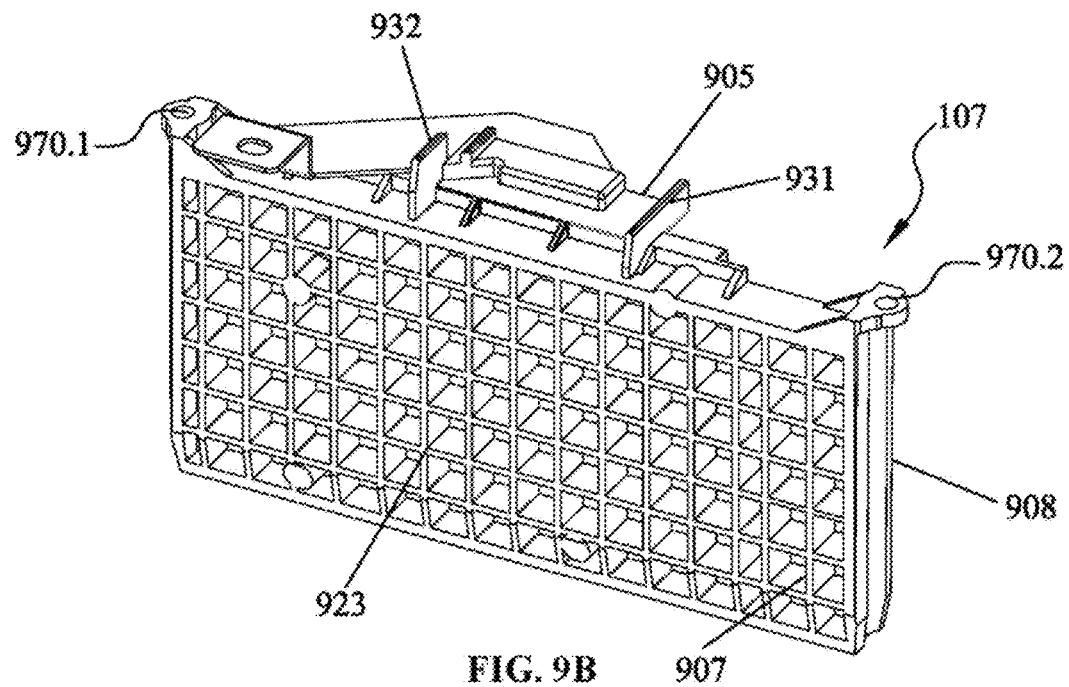
FIG. 9B is a schematic diagram of a front face of the first end plate of the battery pack of the present disclosure.
Figure 9C:
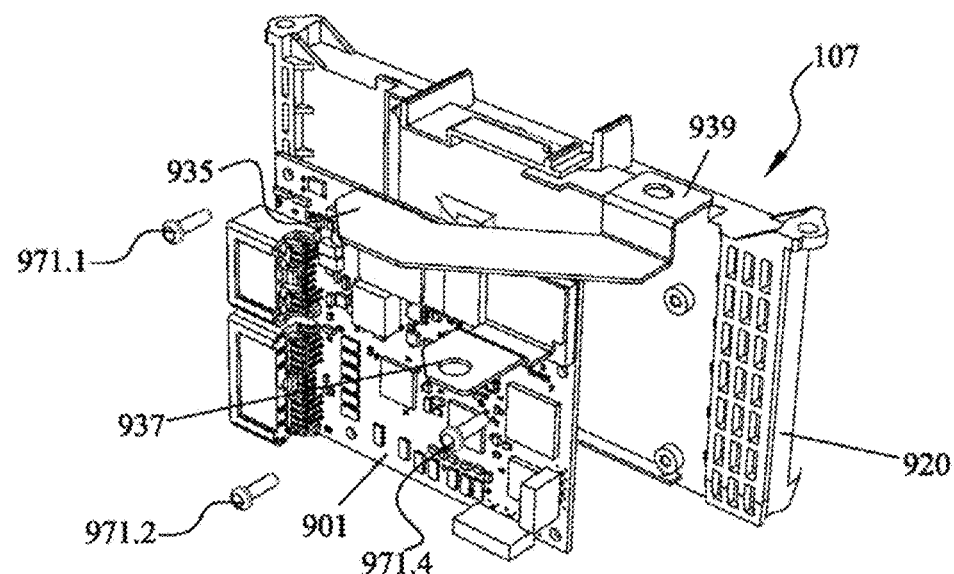
FIG. 9C is an exploded view of the first end plate of the battery pack of the present disclosure.

FIGS. 9A, 9B and 9C show a first end plate of the battery pack of the present disclosure, wherein FIG. 9A shows a reverse face of the first end plate; FIG. 9B shows a front face of the first end plate; and FIG. 9C shows a schematic view of dissembling the electronic components mounted on the first end plate from the first end plate.

As shown in FIG. 9A, the first end plate 107 has a first end plate body 920, a material of the first end plate body 920 being identical to the material of the housing 102, i.e., the first plastic material. A circuit board 901 may be mounted on the reverse face 908 of the first end plate 107. As will be described in detail in conjunction with FIG. 15, a control circuit 1501 is provided on the circuit board 901, for circuit control of the battery pack 100. The circuit board 901 has several plugins 929, for connecting the circuit board 901 with the components in the battery pack 100, e.g., the battery cell 103, the fan assembly 111, the relay 1001, and the fuse 1002 or the like (see FIG. 15), thereby monitoring or controlling these components through the control circuit 1501. An upper end of the first end plate body 920 is provided with a protruding portion (931, 932), the protruding portion (931, 932) forming a ventilation guide slot 905. After the battery pack 100 is assembled, the ventilation guide slot 905 is fit with the bearing plate 105 to form a middle gas discharging passage 732 (see FIG. 7) to communicate the lateral gas discharging passage 730 with the vertical gas discharging passage 733. The first end plate 107 further has an end plate bus bar 935 for connecting an anode output end of the serially connected battery cells 103 to a first leading-out terminal 424.1 (a leading-out terminal shown in FIG. 8A), so as to connect the anode output end of the battery pack 100 to the outside of the battery pack 100 via the metal wiring terminal 431.1 for connecting an external load. Two ends of the upper portion of the plate body 920 are also provided with holes (970.1, 970.2) for connecting with the housing 102.

As shown in FIG. 9B, a front face of the first end plate 107 has a fence-like structure, forming several crisscrossed reinforcing ribs 923. The reinforcing ribs 923 face towards the several serially connected battery cells 103, for contacting one battery cell at the outermost side of the several serially connected battery cells 103, so as to support the several battery cells with the second end plate 109 (see FIG. 10) in a horizontal direction. The fence-like structure reinforces the intensity of the first end plate 107, such that it can resist an expansion force from the battery cells more strongly, thereby limiting the expansion of the battery cells. Moreover, the above structure further saves the material of manufacturing the first end plate, reduces the weight of the first end plate, and thus makes the battery pack 100 lighter.

As illustrated in FIG. 9C, the circuit board 901 is secured onto the first end plate 107 via several bolts (971.1, 971.2, 971.3, and 971.4), and the first end plate bus bar 935 is secured onto the circuit board 901 to be electrically conducted with the circuit board 901. The first end plate bus bar 935 has a bus bar first end 937 and a bus bar second end 939, wherein the bus bar first end 937 is connected to the first leading-out terminal 424.1 of the battery pack 100, and the bus bar second end 939 is connected to the bus bar on the battery cell 103 adjacent to the first end plate 107, thereby connecting the anode output end of the several battery cells 103 to the first leading-out terminal 424.1.

Figure 10A:
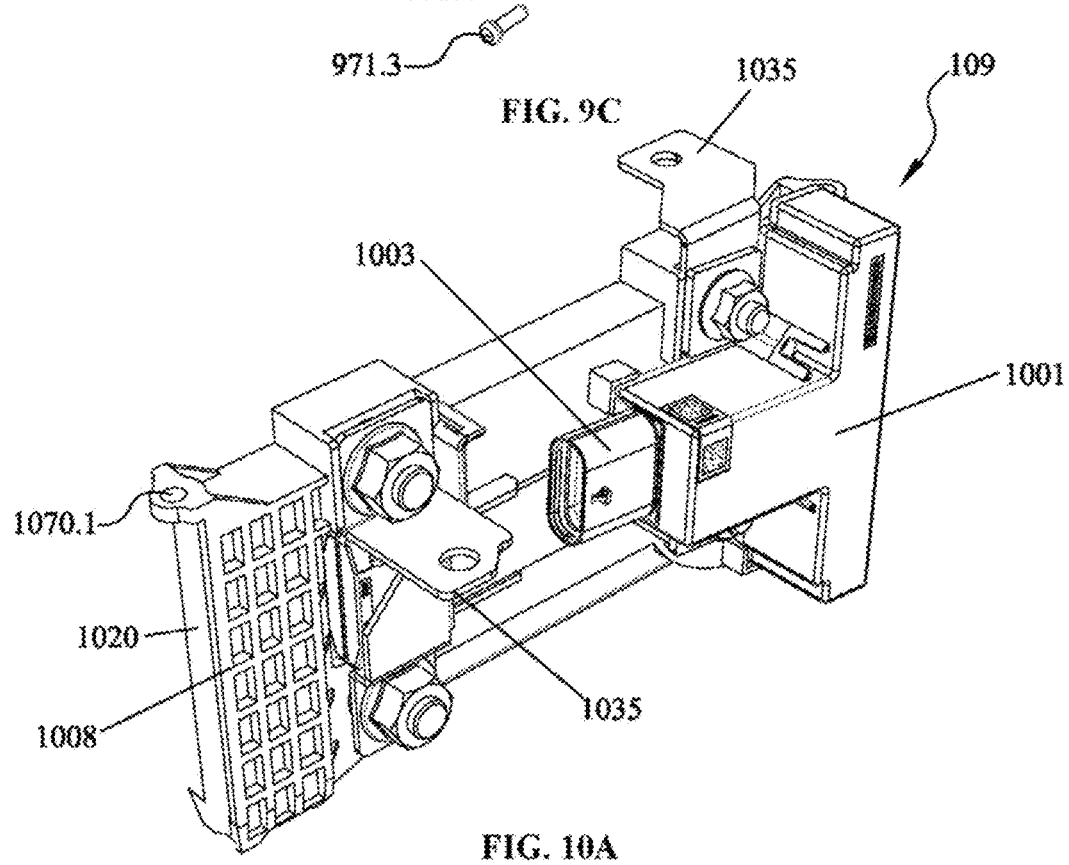
FIG. 10A is a schematic diagram of a reverse face of a second end plate of a battery pack of the present disclosure.
Figure 10B:
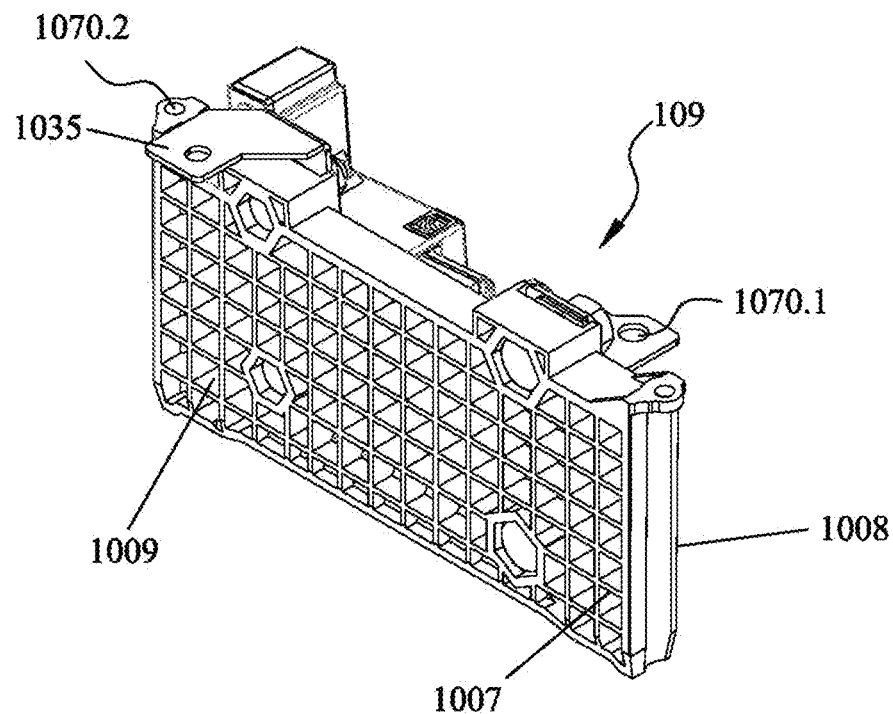
FIG. 10B is a schematic diagram of a front face of the second end plate of the battery pack of the present disclosure.
Figure 10C:
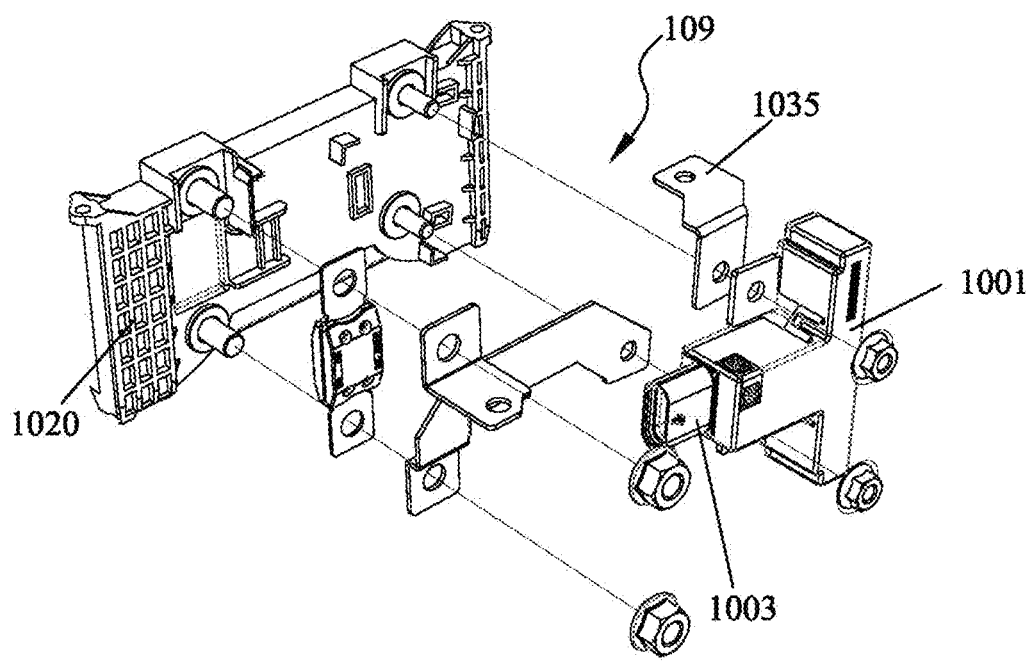
FIG. 10C is an exploded view of the second end plate of the battery pack of the present disclosure.

FIGS. 10A, 10B and 10C show a second end plate of the battery pack of the present disclosure, wherein FIG. 10A shows a reverse face of the second end plate, FIG. 10B shows a front face of the second end plate, and FIG. 10C shows a schematic diagram of dissembling the electronic components mounted on the second end plate from the second end plate.

As illustrated in FIG. 10A, the second end plate 109 has a plate body 1020 on which electronic components and a second end plate bus bar 1035 may be mounted. The electronic components include, for example, a relay 1001 shown in FIG. 10A and a fuse 1002 shown in FIG. 10C. Two ends of the upper portion of the second end plate body 1020 have holes (1070.1, 1070.2) for connecting with the housing 102.

As shown in FIG. 10B, a front face of the second end plate 109 has a fence-like structure, forming several crisscrossed reinforcing ribs 1023, wherein the reinforcing ribs 1023 face the several serially connected battery cells 103, for contacting with an adjacent battery cell 103, thereby cooperating with the first end plate 107 to support the several battery cells 103 in a horizontal direction. The fence-like structure reinforces the strength of the second end plate 109, such that it may resist an expansion force from the battery cells more intensively, thereby limiting expansion of the battery cells. Moreover, the above-described structure also saves the material of manufacturing the first end plate, reduces the weight of the first end plate, and thus makes the battery pack 100 lighter.

As shown in FIG. 10C, it shows more clearly the electronic components on the second end plate 109 and multiple second end plate bus bars 1035, wherein the electronic components may be mounted on the plate body 1020 of the second end plate 109 via fasteners. The electronic components (e.g., the fuse 1002 and the relay 1001) are connected via multiple second end plate bus bars 1035. A relay plugin 1003 is provided on the relay 1001; a relay plugin corresponding to the relay is provided on the circuit board 901 on the first end plate 107; the relay plugins 1003 may be inserted onto the plugins corresponding to the relay on the circuit board 901 via the harness first segment 120.1 and the harness fourth segment 120.4, such that the control circuit 1501 of the circuit board 901 may control the relay 1001. Multiple second end plate bus bars 1035 also connect the cathode output end of the serially connected battery cells to the second leading-out terminal 424.2 (the leading-out terminal shown in FIG. 8A), such that the cathode output end of the several battery cells 103 is connected to the outside of the battery pack 100 via the metal wiring terminal 431.1, for connecting the external load.

Figure 11:
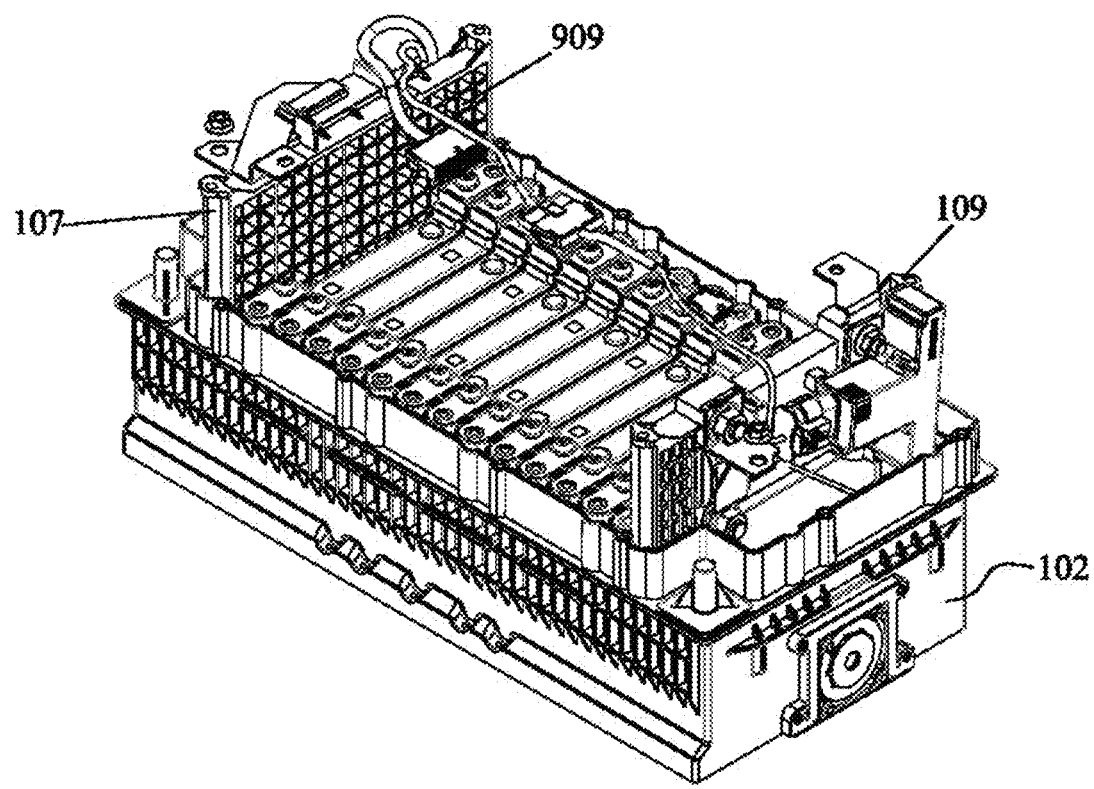
FIG. 11 shows that a first end plate and a second end plate are being mounted into a housing already mounted with several battery cells.

FIG. 11 shows that the first end plate 107 and the second end plate 109 are being mounted into the housing in which several battery cells 103 have been already mounted. As shown in FIG. 11, the front face of the first end plate 107 and the front face of the second end plate 109 face toward the several sequentially arrayed battery cells 103, respectively; and the front face of the first end plate 107 and the front face of the second end plate 109 are in contact with the outermost two of the several battery cells 103, respectively, so as to support the several battery cells 103 in a horizontal direction and generate a pressure against the several battery cells 103, which limits expansion of the battery cells 103 to a certain extent and prolongs the service life of the battery. After the first end plate 107 and the second end plate 109 are inserted into the housing 102, the two end plates are secured on the housing 102 via the holes (970.1, 970.2) at two ends of the upper portion of the first end plate 107 and the holes (1070.1, 1070.2) at two ends of the upper portion of the second end plate 109, respectively. The circuit board 901 on the first end plate is electrically conducted with the electronic components on the second end plate 109 via the harness 120.

Figure 12:
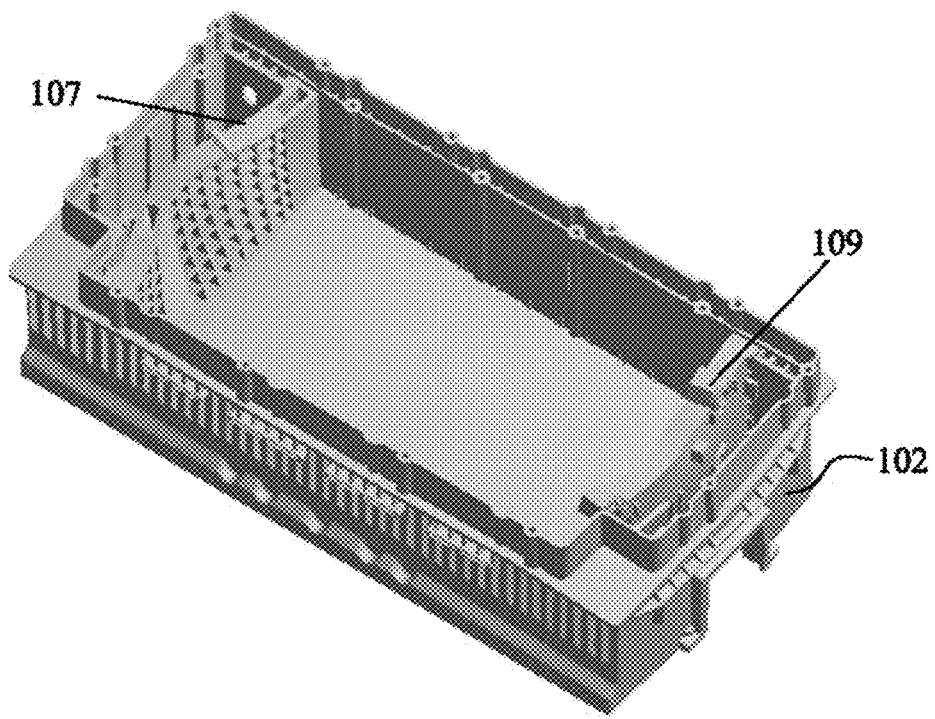
FIG. 12 is a simulation diagram when a first end plate and a second end plate of the battery pack of the present disclosure deform.

FIG. 12 shows a simulation diagram of the first end plate and the second end plate deforming under pressure. During use of the battery, gas may be generated inside each battery cell 103, which causes expansion of the housing of the battery 103. Slight expansion of the battery unit 103 does not affect its use; however, accumulation of slight expansion of each battery cell 103 will cause the size of the several battery cells 103 to have a certain displacement against the original state; therefore, the battery pack 103 comprised of several battery cells 103 needs to be capable of accommodating size changes of the several battery cells 103. The first end plate 107 and the second end plate 109 of the present disclosure can deform to a certain extent such that while supporting the several battery cells 103 and limiting movements of the battery cells 103 in a horizontal direction, they can accommodate size changes of the several battery cells 103. In a simulation experiment of the present disclosure, the maximum deformation displacement of the first end plate 107 and the second end plate 109 may reach 12.16 mm. After the first end plate 107 and the second end plate 109 are inserted into the housing 102, a gap exists between the first end plate 107 and the first width side wall 407; and a gap exists between the second end plate 109 and the second width side wall 409, such that they can accommodate the deformation of the two end plates bending towards two outsides caused by expansion of the several battery cells to enable the shape of the housing of the battery pack 100 to maintain unchanged, facilitating a user to design the size of the accommodation cavity of the battery pack 100.

The present disclosure provides two end plates separate from the housing of the battery pack, which may not only play a role of supporting the several battery cells as mentioned above so as to absorb the expansion of the battery cells, but also may bear various electronic components, such that the electronic components may be arranged at a side face of the battery pack, rather than concentratively borne at the upper portion of the battery pack by the bearing plate, which may more facilitate structural design of the battery pack. Additionally, because the two end plates may be dissembled from the housing of the battery pack, it will become easier to maintain or change the electronic components mounted on the end plate.

Figure 13A:
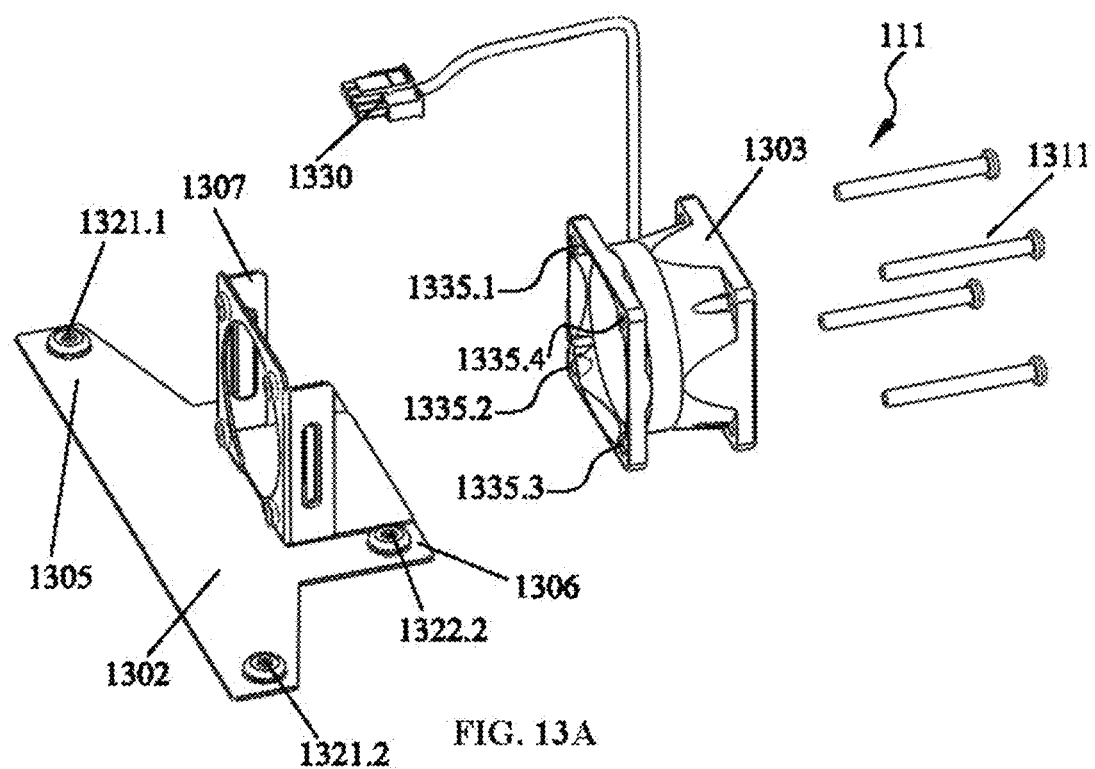
FIG. 13A is an exploded schematic view of a fan assembly in the battery pack shown in FIG. 1A.
Figure 13B:
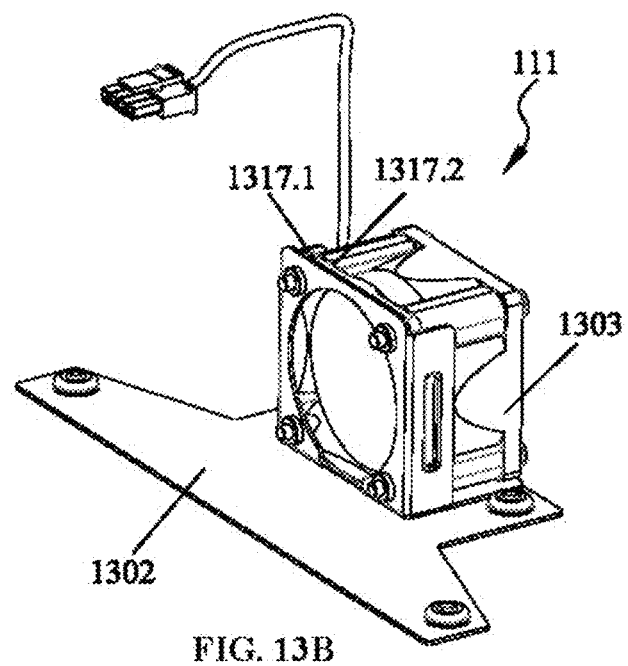
FIG. 13B is an assembly schematic diagram of a fan assembly in the battery pack shown in FIG. 13A.

FIGS. 13A and 13B show a fan assembly in the battery pack shown in FIG. 1A. As shown in FIG. 13A, the fan assembly 111 comprises a fan mounting base plate 1302, a fan mounting bracket 1302, and a fan 1303. The fan mounting base plate 1302 has a proximal end 1305 and a distal end 1306; the fan mounting bracket 1307 is mounted at a distal end 1306 of the fan mounting base plate 1302; the fan mounting bracket 1307 may be connected to the fan mounting base plate 1302 by welding or in other manners such as bolts. The fan mounting base plate 1302 and the fan mounting bracket 1307 are both made of metal materials, such as a cold-rolled sheet. Several mounting holes (1335.1, 1335.2, 1335.3, 1335.4) are provided at an axial outside portion of the fan 1303, and the fan 1303 may be secured on the fan mounting bracket 1307 via a side fastener 1331. A width of the proximal end 1305 of the fan mounting base plate 1302 is larger than a width of a distal end 1306 of the fan mounting base plate 1302, such that a trapezoid transition edge is formed between the width of the proximal end 1305 of the fan mounting base plate 1302 and the width of the distal end 1306 of the fan mounting base plate 1302. A width of the fan mounting bracket 1307 is smaller than a width of the distal end 1306 of the fan mounting base plate 1302. A pair of oppositely disposed distal end mounting holes (1322.1, 1322.2) are provided on two edges of the distal end 1306 of the fan mounting base plate 1302, and a pair of oppositely disposed proximal end mounting holes (1321.1, 1321.2) are provided on two edges of the proximal end 1305 of the fan mounting base plate 1302. When the fan mounting bracket 1307 is mounted on the distal end 1306 of the fan mounting base plate 1302, a side bracket edge is formed at two sides of the distal end 1306 of the fan mounting base plate 1302, where the bracket edge may accommodate the distal end mounting holes 1322.

Still as shown in FIG. 13, a fan assembly plugin 1330 is provided on the fan assembly 111. A corresponding fan assembly plugin is provided on the circuit board 901 of the battery pack 100. When the fan assembly 111 is mounted into the housing 102, the fan assembly plugin 1330 may be electrically inserted into the corresponding fan assembly plugin on the circuit board 901 via the harness 120, such that the fan assembly 111 may be electrically connected with the circuit board 901 to enable the circuit board 901 to monitor a working state of the fan assembly 111.

Figure 14A:
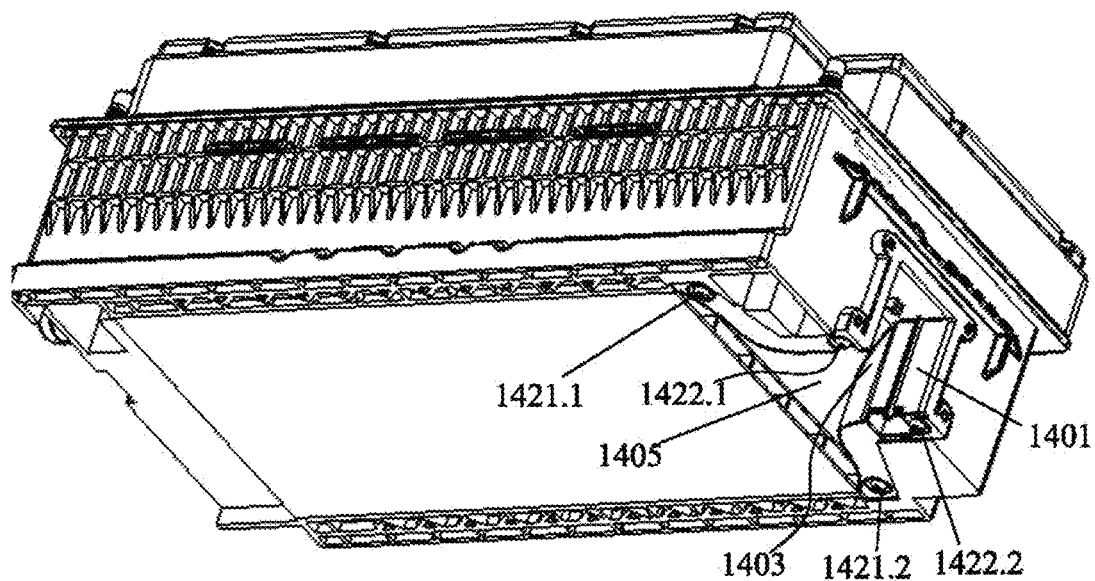
FIG. 14A is a stereoscopic schematic view from another perspective of the housing of the battery pack of the present disclosure.

FIG. 14A shows the housing 102 without mounting a fan. In the present disclosure, the fan assembly 111 is a component optionally configured such that a user may optionally select the fan assembly 111 according to heat dissipation demands; with a low heat dissipation demand, the battery pack 100' without mounting the fan assembly 111 may work normally.

With reference to FIG. 14A and FIG. 7, the housing bottom portion 102 has a heat dissipation apparatus 701 that is made of a metal with a better heat conductivity, e.g., aluminum. The heat dissipation apparatus is substantially of a cylindrical structure having openings at both ends to form an air passage 702. The air passage has an air passage inlet 703 and an air passage outlet 705. According to one embodiment of the present disclosure, a width of the air passage 702 is substantially equivalent to the width of the battery cell 103. The heat dissipation apparatus 701 is embedded into a bottom portion of the housing 102 during a molding process of the housing 102. As shown in FIG. 1C and FIG. 7, a heat dissipation pad 140 is provided above the heat dissipation apparatus 701, and the heat dissipation pad 140 is mounted into the housing from the opening 410 of the housing 102. The heat dissipation pad 140 contacts the heat dissipation apparatus 701 to conduct heat generated by the several battery cells 103 to the heat dissipation apparatus 701.

When the fan assembly 111 is not configured in the battery pack, the heat is absorbed, conducted, and dissipated by walls of the air passage 702. When the fan assembly 111 is configured in the battery pack, the fan assembly 111 guides air to flow in via the air passage inlet 703 and to be discharged out from the air passage outlet 705 via the fan. The fan assembly 111 accelerates air flow in the air passage 702 to dissipate the heat of the heat dissipation apparatus 701 more quickly, and accelerates the heat dissipation rate of the battery pack 100.

As illustrated in FIG. 14A, the housing 102 has a fan assembly side wall opening 1401 and a fan assembly mounting accommodation cavity 1403. The fan assembly side wall opening 1401 is provided on the second width side wall 409, and has a width matching the width of the fan 1303 such that the fan may discharge hot air out of the housing 102 from the air passage 702. The fan assembly mounting accommodation cavity 1403 extends upwards to a top portion of the housing 102 from the bottom face of the housing 102, for accommodating the fan 1303 and its mounting bracket 1307. The fan assembly mounting accommodation cavity 1403 is in fluid connection with the fan assembly side wall opening 1401 and the outlet 705 of the air passage 702; however, the fan assembly mounting accommodation cavity 1403 is not in communication with an internal space of the housing 102 accommodating the battery cells 103.

The housing 102 has a bottom portion opening 1405 in communication with a mounting accommodation cavity 1403. A shape of the bottom portion opening 1405 matches the shape of the fan mounting base plate 1302. The fan assembly mounting accommodation cavity 1403 and the bottom portion opening 1405 of the housing 102 are designed such that the fan assembly 111 may be inserted into the fan assembly mounting accommodation cavity 1403 from the bottom portion opening 1405 of the housing 102 to enable a proximal end 1305 of the fan mounting base plate 1302 to substantially overlap with an edge of the bottom portion 401 of the housing 102, and to enable the fan mounting base plate 1302 to cover the bottom portion opening 1405 of the housing 102. According to an embodiment of the present disclosure, a width of the fan assembly side wall opening 1401 may be configured to be slightly larger than the width of the fan mounting bracket 1307 so that the fan assembly 111 may be more readily mounted into the fan assembly mounting accommodation cavity 1403 or disassembled from the fan assembly mounting accommodating cavity 1403.

Mounting holes (1422.1, 1422.2) and mounting holes (1421.1, 1421.2) corresponding to distal end mounting holes (1322.1, 1322.2) and proximal end mounting holes (1321.1, 1321.2) on the fan mounting base plate 1302 are provided at the bottom portion of the fan assembly side wall opening 1401, respectively, so as to secure the fan mounting base plate 1302 bearing the fan 1303 to the bottom portion of the housing using fasteners.

It may be seen from FIG. 14A that the fan assembly mounting accommodation cavity 1403 is relatively wide at a position proximal to the outlet 705 of the air passage 702, and is substantially equivalent to the width of the outlet 705 of the air passage 702, to facilitate discharging the hot air in the air passage 702. However, the fan assembly mounting accommodation cavity 1403 is relatively narrow at a position proximal to the fan assembly side wall opening 1401, and is substantially equivalent to the widths of the fan 1303 and its mounting bracket 1307, to provide support to the fan assembly in a width direction of the housing. Therefore, the fan assembly mounting accommodation cavity 1403 has a substantially trapezoid shape in the length direction of the housing, and the bottom portion opening 1405 of the fan assembly mounting accommodation cavity 1403 also has a trapezoid shape substantially matching it. The above-mentioned forming a trapezoid transition edge between a width of the proximal end 1305 of the fan mounting base plate 1302 and a width of the distal end 1306 of the fan mounting base plate 1302 is to match the shape of the bottom portion opening 1405 of the fan assembly mounting accommodation cavity 1403 to seal the bottom portion opening 1405.

Figure 14B:
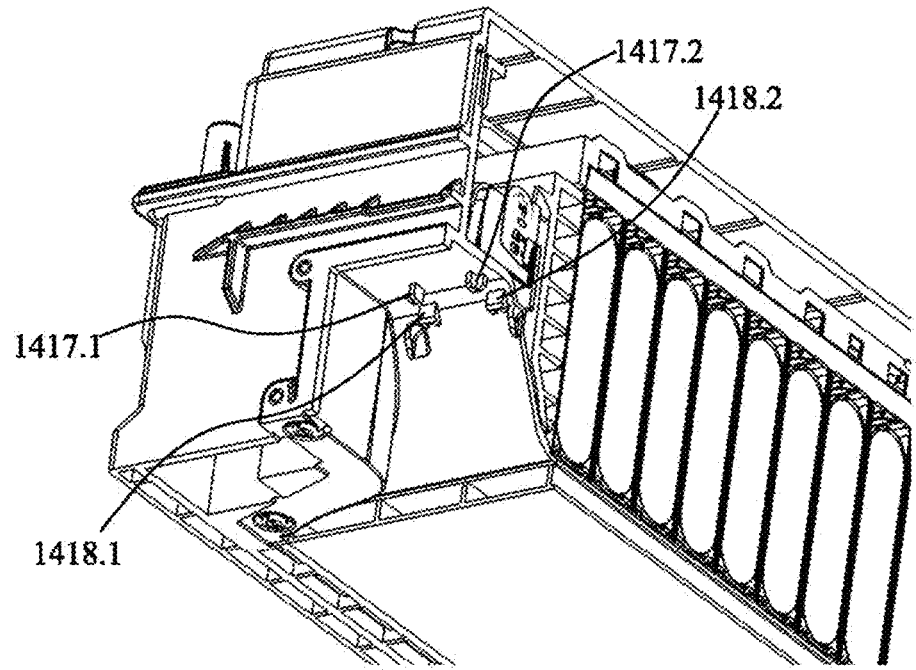
FIG. 14B is a partial sectional view along B-B line in FIG. 1B.

FIG. 14B is a partial sectional schematic view along a B-B line in FIG. 1B, which shows a blocking part in the fan assembly mounting accommodation cavity 1403 for limiting a movement of the fan assembly in a length direction of the housing 102. Specifically, as illustrated in FIG. 13B, an upper portion of the fan 1303 has a side edge 1317.1, and the fan mounting bracket 1307 has a side edge 1317.2; after the fan 1303 is mounted on the fan mounting bracket 1307, a thickness h is formed between the side edge 1317.1 of the fan 1303 and the side edge 1317.2 of the fan mounting bracket 1307. As shown in FIG. 14B, the fan assembly mounting accommodation cavity 1403 has a first blocking portion (1417.1, 1417.2) and a second blocking portion (1418.1, 1418.2), wherein a distance between the first blocking portion (1417.1, 1417.2) and the second blocking portion (1418.1, 1418.2) is arranged to be capable of accommodating the thickness h formed between the side edge 1317.1 of the fan 1303 and the side edge 1317.2 of the fan mounting bracket 1307. Therefore, when the fan assembly 111 is mounted in the fan accommodation cavity 1403, an upper portion of the fan assembly may be stuck between the first blocking portion (1417.1, 1417.2) and the second blocking portion (1418.1, 1418.2) to limit a movement of the fan assembly 111 in the horizontal direction relative to the housing 102. As an embodiment, the first blocking portion (1417.1, 1417.2) in the fan assembly mounting accommodation cavity 1403 extends from the top portion of the fan assembly mounting accommodation cavity 1403 to the bottom portion opening 1405 of the housing 102, while the second blocking portion (1418.1, 1418.2) extends from a side face of the fan assembly mounting accommodation cavity 1403 towards the fan assembly side wall opening 1401.

Figure 14C:
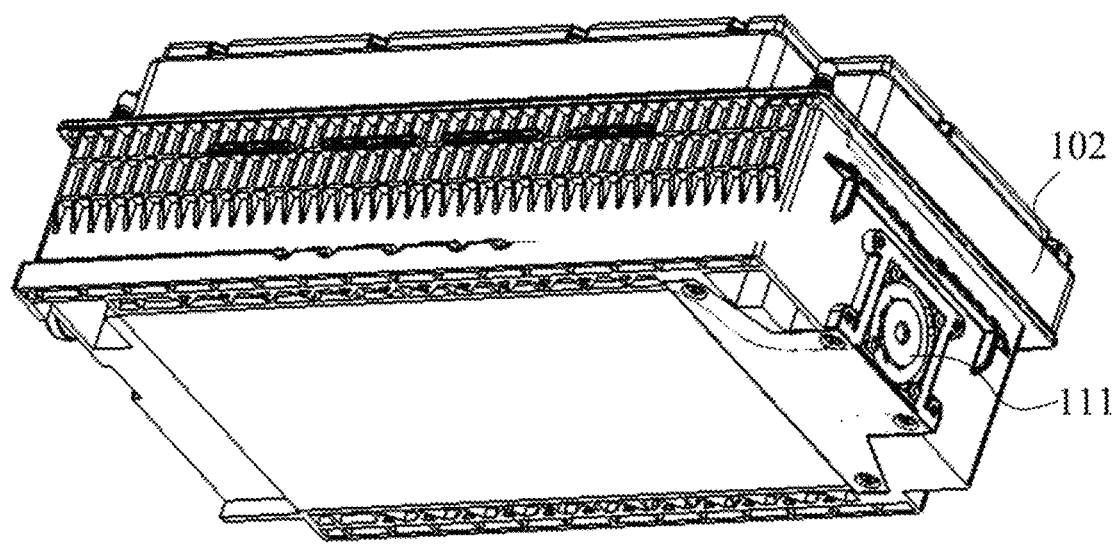
FIG. 14C is a schematic diagram of the housing in FIG. 14A mounted with a fan.

FIG. 14C shows a housing 102 mounted with a fan assembly 111. In the present disclosure, the above-described mounting structure of the fan assembly 111 enables the fan assembly 111 to be conveniently disassembled so that the battery pack may or may not be provided with the fan assembly 111 as needed. After the bottom portion fasteners are dismantled and the fan assembly plugin 1330 is disengaged from the corresponding fan assembly plugin on the circuit board 901, the fan assembly 111 can be drawn out downwardly from the bottom portion opening 1405 of the housing 102.

Figure 15:
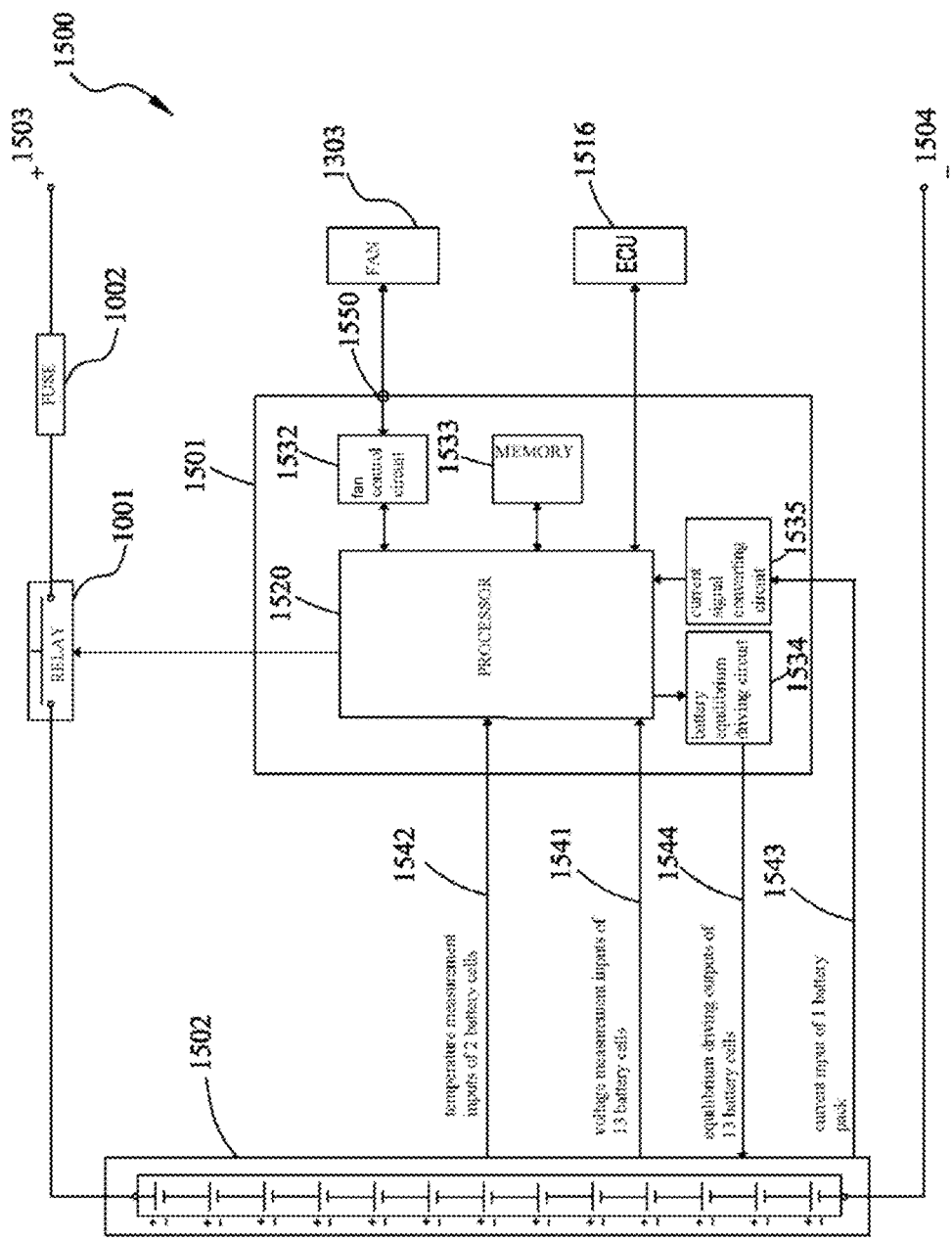
FIG. 15 is a schematic diagram showing a battery pack control system 1500 according to the present disclosure.

FIG. 15 shows a battery pack control system 1500. As shown in FIG. 15, the battery pack control system 1500 comprises a battery 1502 comprised of 13 battery cells connected in series, a battery positive output end 1503, a battery negative output end 1504, a control circuit 1501, a relay 1001, a fuse 1002, a fan 1303, and a hybrid vehicle control unit (ECU) 1516. The 13 battery cells are connected in series through the battery cell bus bars 163 to form the battery 1502.

The control circuit 1501 comprises a processor 1520, a fan control circuit 1532, a memory 1533, a battery cell equilibrium driving circuit 1534, and a current signal switching circuit 1535. The fan control circuit 1532, the memory 1533, the battery cell equilibrium driving circuit 1534, and the current signal switching circuit 1535 are connected with the processor 1520 and operate under control of the processor 1520.

The processor 1520 may read programs (including a series of instructions) and data stored in the memory 1533; the processor 1520 may also store data into the memory

1533. By executing the programs stored in the memory 1533, the processor 1520 may control operation of the battery pack control system 1500.

The battery positive output end 1503 is connected to the positive end of the 13 battery cells connected in series via the relay 1001 and the fuse 1002. Upon instant surging of the current, the fuse 1002 is disconnected to cut off the current output circuit. The relay 1001 is connected to the processor 1520; under control of the processor 1520, the relay 1001 is switched from a connected state to a disconnected state to cut off the current output circuit. The battery positive output end 1503 and the battery group negative output end 1504 are connected to an external load (e.g., a motor of a hybrid vehicle). The fan 1303 is connected to the fan control circuit 1532, and a rotatory speed of the fan 1303 is adjusted under control of the processor 1520.

There are 4 different types of input or output signals at the battery 1502 and the control circuit 1501. The first type of inputs 1541 refers to 13 voltage inputs measured from the 13 battery cells, which are inputted from the battery 1502 to the control circuit 901, so that the control circuit 1501 may monitor the voltage state of the 13 battery cells during operation to control operation of the battery 1502 based on the voltage states of all of the 13 battery cells.

The second type of input signals refers to 2 temperature inputs 1542 measured from 2 selected battery cells, which are inputted from the battery 1502 to the control circuit 1501, so that the control circuit 1501 may monitor the temperature state of the battery pack during operation to control operation of the battery 1502 based on the temperature of the selected 2 battery cells. Of course, the purpose of monitoring the temperature state of the battery pack may also be implemented by selecting to measure the temperature input of a single battery cell.

The third type of input signals refers to a current input 1543 from the battery negative end, which is connected to a current signal converting circuit 1535 that converts current signals into voltage signals that are inputted to the processor 1520, so that the control circuit 1501 monitors an output/input current state of the battery pack during operation, to control operation of the battery 1502 based on the output/output current state of the battery pack. In the embodiments of the present disclosure, the first, second, and third types of input signals are connected to the control circuit 1501 via the harness 120.

The first type of output signals refers to 13 drive outputs 1544 from the battery cell equilibrium drive circuit 1534; the 13 drive outputs 1544 are connected to the positive and negative ends of the 13 battery cells, respectively, to charge or discharge the 13 battery cells under control of the processor 1520, to maintain equilibrium of the voltages of the 13 battery cells during operation. The first type of outputs is also connected to the positive and negative output ends of the 13 battery cells via the harness 120.

In the battery pack control system 1500, a battery cell voltage upper limit value, a battery cell voltage lower limit value, a battery cell voltage difference upper limit value, a temperature upper limit value, a temperature lower limit value, and an operating current upper limit value are set. During operation, when a voltage of a certain battery cell detected by the processor 1520 is higher than the battery cell voltage upper limit value or lower than the battery cell voltage lower limit value, or when a voltage difference value between any two battery cells as detected is higher than the voltage difference upper limit value, or when a temperature of the battery 1502 as detected is above the temperature upper limit value/below the temperature lower limit value, or when an output current of the battery 1502 as detected exceeds the upper limit value of the operating current, the processor 1520 emits a cutoff signal to the relay 1001, causing the relay 1001 to change from the connected state to the disconnected state to cut off the current output circuit.

Moreover, during operation, the processor 1520 detects whether the battery pack control system 1500 is connected with a fan 1303 through a port 1550 (e.g., by detecting the resistance amount of the port 1550). If the processor 1520 detects that the battery pack control system 1500 is not connected with the fan 1303, the processor 1520 will not perform wind speed control. If the processor 1520 detects that the battery pack control system 1500 is connected with the fan 1303, the processor 920 will constantly emit a signal (e.g., PWM-duty cycle signal) to control the rotating speed of the fan 1303 based on the detected battery temperature.

In addition, during operation, the processing 1520 detects the voltage of each battery cell of the 13 battery cells; if needed, the processor 1520 initiates the battery cell equilibrium drive circuit 1544, selects a battery cell, and charge (increasing the voltage) or discharge (decreasing the voltage) it, causing the voltage differences among the 13 battery cells to reach an equilibrium within a prescribed scope.

Further, the processor 1520 emits corresponding control signals to the hybrid vehicle control unit based on the detected voltage state of the 13 battery cells, the temperature state of the selected 2 battery cells, and the battery current output state, to enable an external load (e.g., a motor of the hybrid vehicle) to run in an optimum operation state.

The battery pack provided by the present disclosure used in a micro-hybrid vehicle enhances fuel efficiency and reduces exhaust emissions, particularly $CO_2$ gas emissions. As hybrid vehicles increasingly use some components with a larger power, e.g., an electric air-conditioner, an electric turbocharger, and an electric power steering, etc., a battery that may provide a larger power is needed. The 48V, 10 Ah battery pack provided by the present disclosure can enable a traditional hybrid vehicle to save about 15% fuel, and to have a compact structure and a small size. When an extreme circumstance occurs to the battery pack, the battery cells will be broken to release gas, avoiding risks from the battery pack; in prior designs, a gas discharging passage needs to be designed for the battery pack to discharge the gas released from breaking of the battery cells outside of the battery pack; while in the present disclosure, an improvement is made by using the structure of the battery pack per se to form a gas discharging passage, which makes it unnecessary to additionally design a specific gas discharging passage; in this way, the present disclosure saves materials and space and makes the structure of the battery pack compact. The battery pack provided by the present disclosure further comprises two end plates disposed at two sides of the battery cells, respectively; in addition to bearing the electronic components and connecting a circuit, the two end plates also play a role of supporting the several battery cells to facilitate mounting the battery cells and provide a certain pressure against the battery cells thereby to limit expansion of the battery cells within a certain extent and prolong the service life of the battery cells; moreover, they may deform to absorb expansion of the battery cells to enable the housing of the entire battery pack to maintain unchanged. In the present disclosure, the material surrounding the metal wiring terminals is different from the material of the housing, wherein a material with good insulation and anti-corrosion performance is adopted surrounding the metal wiring terminal, while the housing adopts a material with good mechanical performance; the material surrounding the metal wiring terminal may tolerate a temperature rise and possible corrosion of the metal wiring terminals during the battery use, while the material of the housing has a relatively high strength and hardness, which may protect internal components of the battery pack. The present disclosure also provides an optional fan assembly such that a user may select whether to equip based on different heat dissipation needs; in a low heat dissipation demand, the fan assembly may not be mounted, and heat dissipation may be implemented only by means of the heat dissipation apparatus at the bottom portion of the battery pack, which may lower the cost for some users.

Although only some features of the present disclosure are illustrated and described, various improvements and changes may be made by those skilled in the art. Therefore, it should be understood that the appended claims are intended to cover all improvements and changes within the substantive spirit of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

We claim:

1. A battery pack comprising a housing and an upper cover, wherein the housing has a bottom portion; the housing further has a first length side wall, a second length side wall, a first width side wall and a second width side wall that extend upward surrounding a periphery of the bottom portion; the first length side wall, the second length side wall, the first width side wall and the second width side wall form an upper portion opening; the upper cover is mounted on the upper portion opening of the housing; the housing further has a vertical gas discharging passage disposed on an inner side of the first width side wall; the first width side wall is provided with a gas discharging port; the vertical gas discharging passage is in fluid communication with a lateral gas discharging passage; and the battery pack is characterized by comprising:

multiple flat battery cells sequentially arranged and mounted in the housing;

a bearing plate, wherein the bearing plate is disposed above the top portions of the multiple battery cells; and a middle recessed portion formed between protruding battery cell anode and battery cell cathode disposed on the top portion of each of the multiple battery cells, wherein a surface of the middle recessed portion is provided with at least one seal-breakable opening, and the at least one seal-breakable opening is arranged to discharge a gas generated in the battery cell when broken;

when the multiple battery cells are sequentially arranged and mounted in the housing, the multiple middle recessed portions at the top portions of the multiple battery cells form a battery top portion through-slot; and a bottom portion of the bearing plate is provided with a bearing plate bottom portion through-slot, and when the bearing plate is mounted above the top portions of the multiple battery cells, the bearing plate bottom portion through-slot is press-fitted with the battery top portion through-slot to form the lateral gas discharging passage, wherein the lateral gas discharging passage is provided with an outlet, and another end of the lateral gas discharging passage is blocked; and a first end plate and a second end plate, wherein the multiple battery cells are sequentially arranged and mounted into the housing, the first end plate and the second end plate being located at two end sides of the sequentially arranged multiple battery cells to laterally fix the sequentially arranged multiple battery cells, wherein an upper end of the first end plate is provided with a ventilation guide slot, and the ventilation guide slot is located between the lateral gas discharging passage and the vertical gas discharging passage to enable the lateral gas discharging passage to be in fluid communication with the vertical gas discharging passage.

2. The battery pack according to claim 1, characterized in that:
an electronic component for controlling the battery pack is mounted on a reverse face of the first end plate.

3. The battery pack according to claim 1, characterized in that:
the bottom portion is provided with a heat dissipation apparatus, wherein the heat dissipation apparatus is provided with an air passage, and the air passage has an inlet and an outlet.

4. The battery pack according to claim 1, characterized in that:
the heat dissipation apparatus is provided with a heat dissipation pad, and two sides of the heat dissipation pad are in contact with the bottom portions of the multiple battery cells and an upper portion of the air passage respectively.

5. The battery pack according to claim 4, characterized in that:
the bearing plate fixes the sequentially arranged and mounted multiple battery cells in a perpendicular direction of the housing.

6. The battery pack according to claim 5, characterized by further comprising:
a circuit board, wherein a control circuit is mounted on the circuit board; and
a harness, wherein part of the harness is loaded on the bearing plate, and the harness comprises multiple connection wires to connect each of the multiple battery cells to the control circuit.

7. The battery pack according to claim 5, characterized by further comprising:
multiple battery cell bus bars, wherein the multiple battery cell bus bars are accommodated in the bearing plate; the multiple battery cell bus bars are configured to connect each of the multiple battery cells together in series.

8. The battery pack according to claim 1, characterized in that:
a distal end of the bearing plate bottom portion through-slot is provided with a blocking plate, and when the bearing plate is mounted at the top portions of the multiple battery cells, the bearing plate bottom portion through-slot is press-fitted with the battery top portion through-slot to form a lateral gas discharging passage, the another end of the lateral gas discharging passage is blocked by the blocking plate.

* * * * *

UNITED STATES PATENT AND TRADEMARK OFFICE
CERTIFICATE OF CORRECTION

PATENT NO. : 11,322,794 B2
APPLICATION NO. : 16/348461
DATED : May 3, 2022
INVENTOR(S) : Chang Liu et al.

Page 1 of 1

It is certified that error appears in the above-identified patent and that said Letters Patent is hereby corrected as shown below:

On the Title Page

1. Page 2, in Item (56), under "U.S. PATENT DOCUMENTS", in Column 2, Line 1, delete "2015/0369829" and insert -- 2015/0069829 --, therefor.

In the Specification

2. In Column 1, Line 43, delete "design" and insert -- designed --, therefor.

3. In Column 13, Line 50, delete "concentratively" and insert -- conservatively --, therefor.

4. In Column 16, Line 54, delete "control unit (ECU)" and insert -- electronic control unit (ECU) --, therefor.

5. In Column 19, Line 62, delete "show" and insert -- shown --, therefor.

Signed and Sealed this
Ninth Day of April, 2024

Katherine Kelly Vidal
*Director of the United States Patent and Trademark Office*